(12) United States Patent
Obara et al.

(10) Patent No.: US 11,930,136 B2
(45) Date of Patent: Mar. 12, 2024

(54) READING DEVICE AND IMAGE FORMING APPARATUS

(71) Applicant: FUJIFILM BUSINESS INNOVATION CORP., Tokyo (JP)

(72) Inventors: Noriyuki Obara, Kanagawa (JP); Hidemasa Takahashi, Kanagawa (JP); Kazunobu Sato, Kanagawa (JP); Shigeru Tamura, Kanagawa (JP); Yuki Iguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 309 days.

(21) Appl. No.: 17/540,830

(22) Filed: Dec. 2, 2021

(65) Prior Publication Data
US 2023/0053917 A1 Feb. 23, 2023

(30) Foreign Application Priority Data

Aug. 23, 2021 (JP) ................................. 2021-135482

(51) Int. Cl.
*H04N 1/04* (2006.01)
*H04N 1/00* (2006.01)

(52) U.S. Cl.
CPC ..... *H04N 1/00037* (2013.01); *H04N 1/00013* (2013.01); *H04N 1/00084* (2013.01); *H04N 1/00543* (2013.01); *H04N 1/00602* (2013.01); *H04N 1/00689* (2013.01); *H04N 1/00713* (2013.01); *H04N 1/00774* (2013.01)

(58) Field of Classification Search
USPC ...................................... 358/1.112, 498, 496
See application file for complete search history.

(56) References Cited

U.S. PATENT DOCUMENTS

| 6,177,977 B1* | 1/2001 | Tanaka | B65H 29/52 |
| | | | 355/24 |
| 10,148,851 B2 | 12/2018 | Furukawa et al. | |
| 2015/0309465 A1* | 10/2015 | Matsumoto | G03G 15/652 |
| | | | 399/21 |

FOREIGN PATENT DOCUMENTS

| JP | 2005-029327 A | 2/2005 |
| JP | 2018-107566 A | 7/2018 |

* cited by examiner

*Primary Examiner* — Cheukfan Lee
(74) *Attorney, Agent, or Firm* — Oliff PLC

(57) ABSTRACT

A reading device includes: plural transport rolls that transport a document along a transport path, include a discharge roll disposed on a most downstream side of the transport path, and rotate and do not rotate in synchronization with one another; an opening and closing unit that exposes or covers an upstream portion of the transport path; plural detectors that are provided apart from one another along the transport path, detect a transported document, and include a discharge detector that is disposed on a most downstream side of the transport path and is disposed on an upstream side relative to the discharge roll in a document transport direction; a reader that reads an image formed on a transported document in a downstream portion of the transport path; and a controller that stops the plural transport rolls once upon occurrence of a document jam inside a device body by controlling the transport rolls and rotates the transport rolls for only a predetermined period in a case where the discharge detector is detecting no document and a length of a document is equal to or longer than a threshold length.

6 Claims, 21 Drawing Sheets

READING DEVICE AND IMAGE FORMING APPARATUS

CROSS-REFERENCE TO RELATED APPLICATIONS

This application is based on and claims priority under 35 USC 119 from Japanese Patent Application No. 2021-135482 filed Aug. 23, 2021.

BACKGROUND

(i) Technical Field

The present disclosure relates to a reading device and an image forming apparatus.

(ii) Related Art

An image reading device described in Japanese Unexamined Patent Application Publication No. 2018-107566 reads a document image of a transported document by a scanner unit and a Charge Coupled Device sensor unit. A post-separation sensor, a lead sensor, and a discharge sensor provided on a transport path detect occurrence of a jam. There are two methods for restarting document reading processing after occurrence of a jam, specifically, a first restarting method of placing all documents again on a document tray and a second restarting method of placing only unread documents again on the document tray, and a user sets any one of these methods.

SUMMARY

A reading device that reads an image formed on a document includes plural transfer rolls that transport a document along a transport path and rotate and do not rotate in synchronization with one another, a reader that reads an image formed on the document, and plural detection units disposed apart from one another along the transport path. A discharge detection unit disposed on a most downstream side of the transport path among the plural detection units is disposed on an upstream side in a document transport direction relative to discharge rolls disposed on a most downstream side of the transport path among the plural transfer rolls.

According to such a configuration, the plural transfer rolls that transport a document stop upon occurrence of a document jam in a device body. This may produce a situation where a document that has passed the discharge detection unit is held between the discharge rolls. In such a case, it is conceivable to rotate the discharge rolls for only a predetermined period after the stoppage of the plural transfer rolls and thereby discharge the document held between the discharge rolls to an outside of the device body.

However, the plural transfer rolls rotate and do not rotate in synchronization with one another, and therefore when the discharge rolls are rotated, other transfer rolls are also rotated. When the other transfer rolls rotate, a document jammed inside the device body moves. For example, in a case where the jammed document is short, the jammed document may undesirably move to a place where the document is hard to remove.

Aspects of non-limiting embodiments of the present disclosure relate to making it less likely that a state where a document having a length equal to or longer than a threshold value is held between discharge rolls is maintained than in a case where a state where plural transfer rolls are stopped is maintained, in a case where a document jam occurs in a configuration in which the plural transfer rolls rotate and do not rotate in synchronization with one another.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a reading device including: plural transport rolls that transport a document along a transport path, include a discharge roll disposed on a most downstream side of the transport path, and rotate and do not rotate in synchronization with one another; an opening and closing unit that exposes or covers an upstream portion of the transport path; plural detectors that are provided apart from one another along the transport path, detect a transported document, and include a discharge detector that is disposed on a most downstream side of the transport path and is disposed on an upstream side relative to the discharge roll in a document transport direction; a reader that reads an image formed on a transported document in a downstream portion of the transport path; and a controller that stops the plural transport rolls once upon occurrence of a document jam inside a device body by controlling the transport rolls and rotates the transport rolls for only a predetermined period in a case where the discharge detector is detecting no document and a length of a document is equal to or longer than a threshold length.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
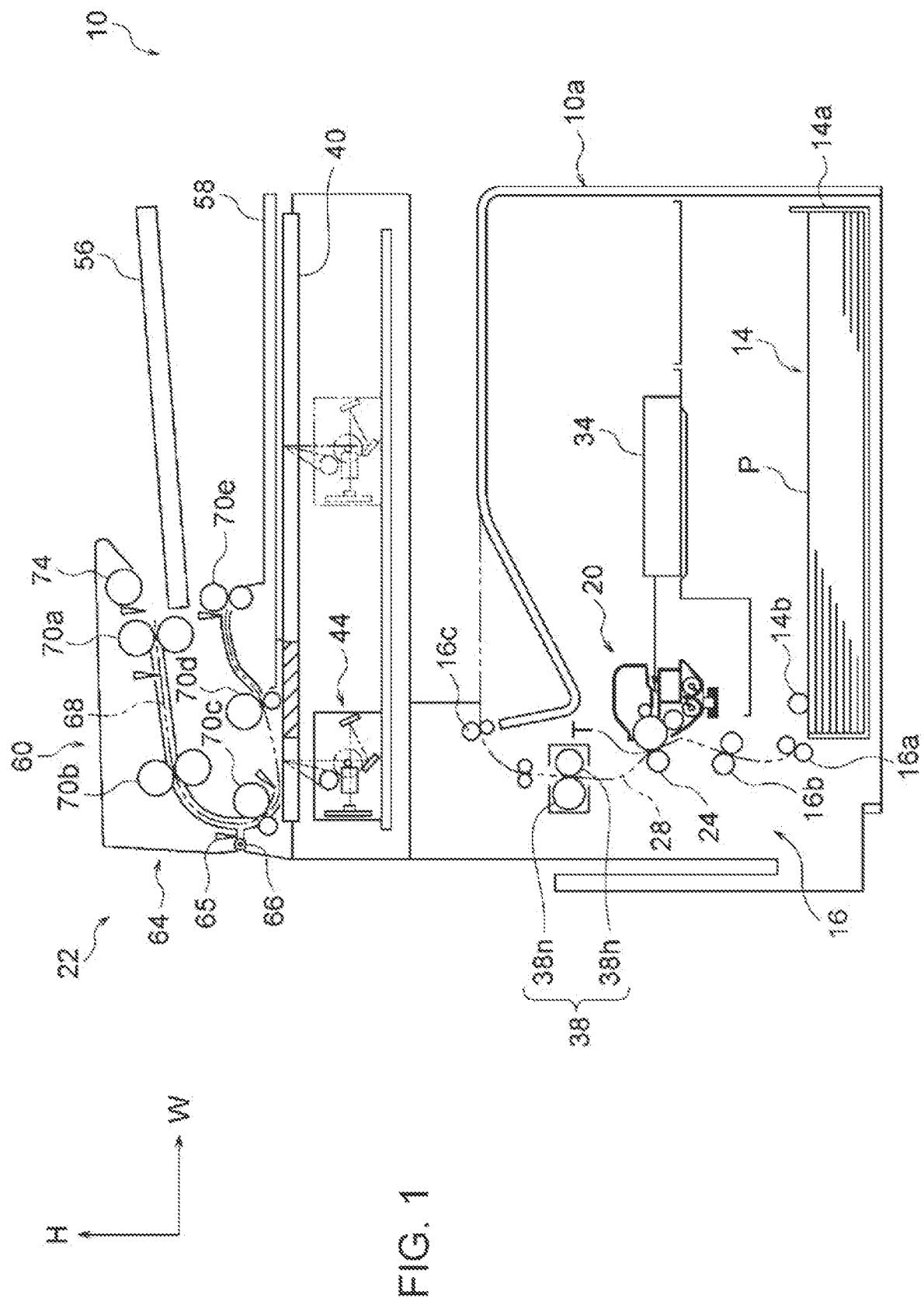
FIG. 1 is a schematic configuration diagram illustrating an image forming apparatus according to a first exemplary embodiment of the present disclosure.

An example of a reading device and an image forming apparatus according to a first exemplary embodiment of the present disclosure is described with reference to FIGS. 1 to 14. In the drawings, the arrow H indicates an apparatus top-bottom direction (vertical direction), and the arrow W indicates an apparatus width direction (horizontal direction).

Image Forming Apparatus 10

As illustrated in FIG. 1, an image forming apparatus 10 includes a storage unit 14 in which sheet members P, which are recording media, are stored, a transport unit 16 that transports a sheet member P stored in the storage unit 14, an image former 20 that forms an image on the sheet member P transported from the storage unit 14 by the transport unit 16, and a reading device 22 that reads an image formed on a document G. The storage unit 14, the image former 20, and the reading device 22 are disposed in this order from a lower side to an upper side.

Storage Unit 14, Transport Unit 16

As illustrated in FIG. 1, the storage unit 14 includes a storage member 14a that is drawable from an apparatus body 10a toward a near side in an apparatus depth direction and in which the sheet members P are stacked and a feeding roll 14b that feeds the sheet members P stacked in the storage member 14a to a transport path 28.

The transport unit 16 includes a separation roll 16a that separates the sheet members P from one another, an adjustment roll 16b that adjusts a transport timing of a sheet member P by stopping the sheet member P once, and a discharge roll 16c that discharges the sheet member P to an outside of the apparatus body 10a. The separation roll 16a, the adjustment roll 16b, and the discharge roll 16c are disposed in this order along the transport path 28 from an upstream side to a downstream side in a direction in which the sheet member P is transported.

Reading Device 22

As illustrated in FIG. 1, the reading device 22 is disposed above the discharge roll 16c and reads an image formed on a document G. Details of the reading device 22 will be described later.

Image Former 20

Figure 2:
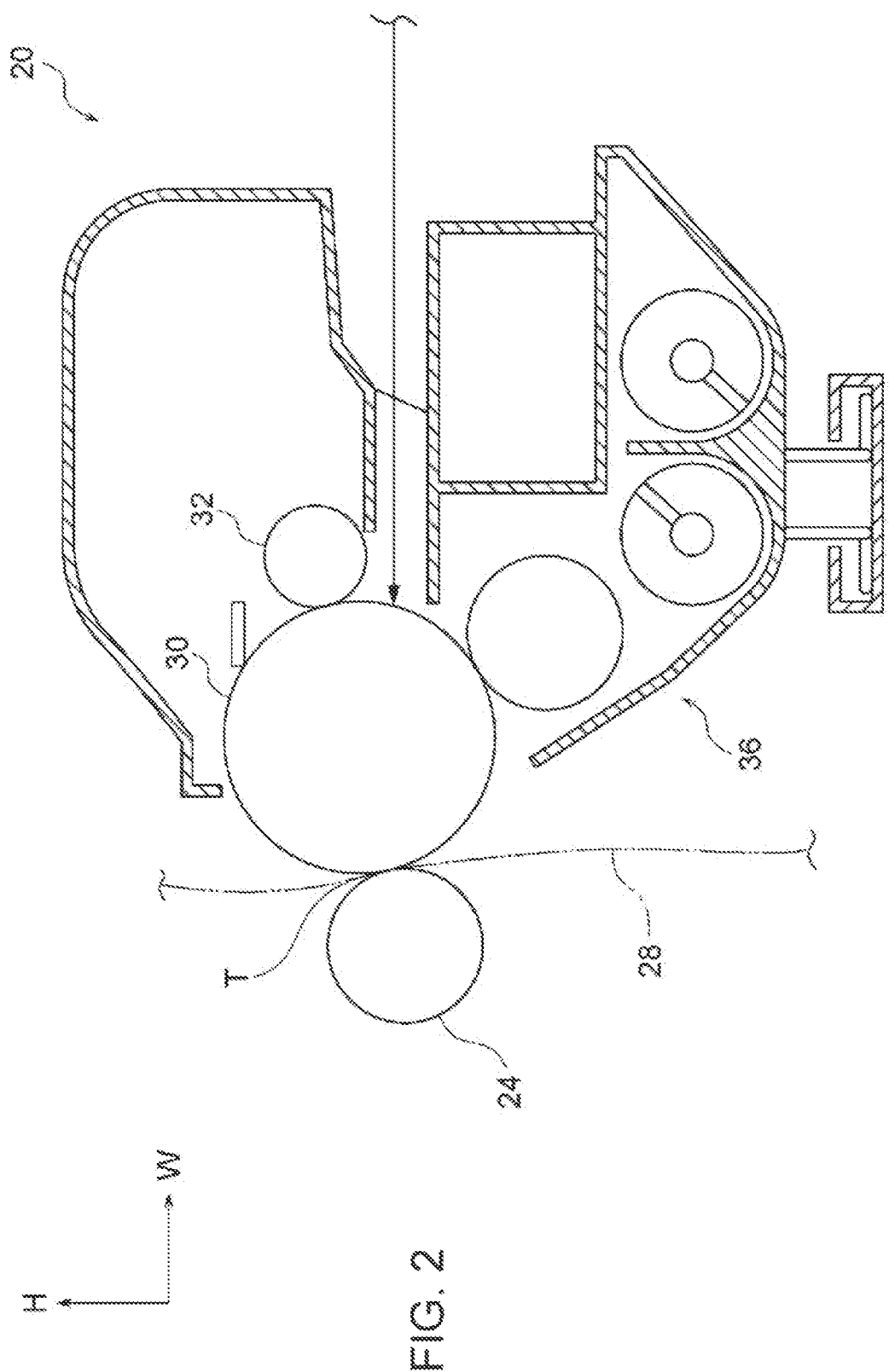
FIG. 2 is a configuration diagram illustrating a toner image former provided in the image forming apparatus according to the first exemplary embodiment of the present disclosure.

As illustrated in FIG. 1, the image former 20 is disposed above the storage unit 14. As illustrated in FIG. 2, the image former 20 includes a circular image carrier 30, a charging member 32 that charges a surface of the image carrier 30, and an exposure device 34 (see FIG. 1) that forms an electrostatic latent image by irradiating the charged surface of the image carrier 30 with exposure light. Furthermore, the image former 20 includes a developing device 36 that develops the electrostatic latent image formed on the surface of the image carrier 30 as a toner image and a transfer roll 24 that transfers the toner image formed on the surface of the image carrier 30 onto a sheet member P transported along the transport path 28.

As illustrated in FIG. 1, the image former 20 includes a fixation device 38 that includes a heating roll 38h and a pressing roll 38n and fixes the toner image on the sheet member P onto the sheet member P by heating and pressing the toner image.

Operation of Image Forming Apparatus 10

In the image forming apparatus 10, an image is formed on a sheet member P as follows.

First, the charging member 32 illustrated in FIG. 2 uniformly negatively-charges the surface of the image carrier 30 at a preset potential. Next, the exposure device 34 forms an electrostatic latent image by irradiating the charged surface of the image carrier 30 with exposure light based on image data read by the reading device 22 illustrated in FIG. 1 or externally input data. Furthermore, the developing device 36 develops the electrostatic latent image formed on the surface of the image carrier 30 to make the electrostatic latent image visible as a toner image.

Then, at a timing determined by the adjustment roll 16b, a sheet member P fed from the storage member 14a to the transport path 28 by the feeding roll 14b is fed to a transfer position T formed by the image carrier 30 and the transfer roll 24. At the transfer position T, the sheet member P is transported while being held between the image carrier 30 and the transfer roll 24, and thereby the toner image formed on the surface of the image carrier 30 is transferred onto the sheet member P.

The fixation device 38 fixes, onto the sheet member P, the toner image transferred onto the sheet member P by heating and pressing the transported sheet member P. Then, the discharge roll 16c discharges the sheet member P on which the toner image is fixed to an outside of the apparatus body 10a.

Configuration of Substantial Part

Next, the reading device 22 is described.

Figure 3:
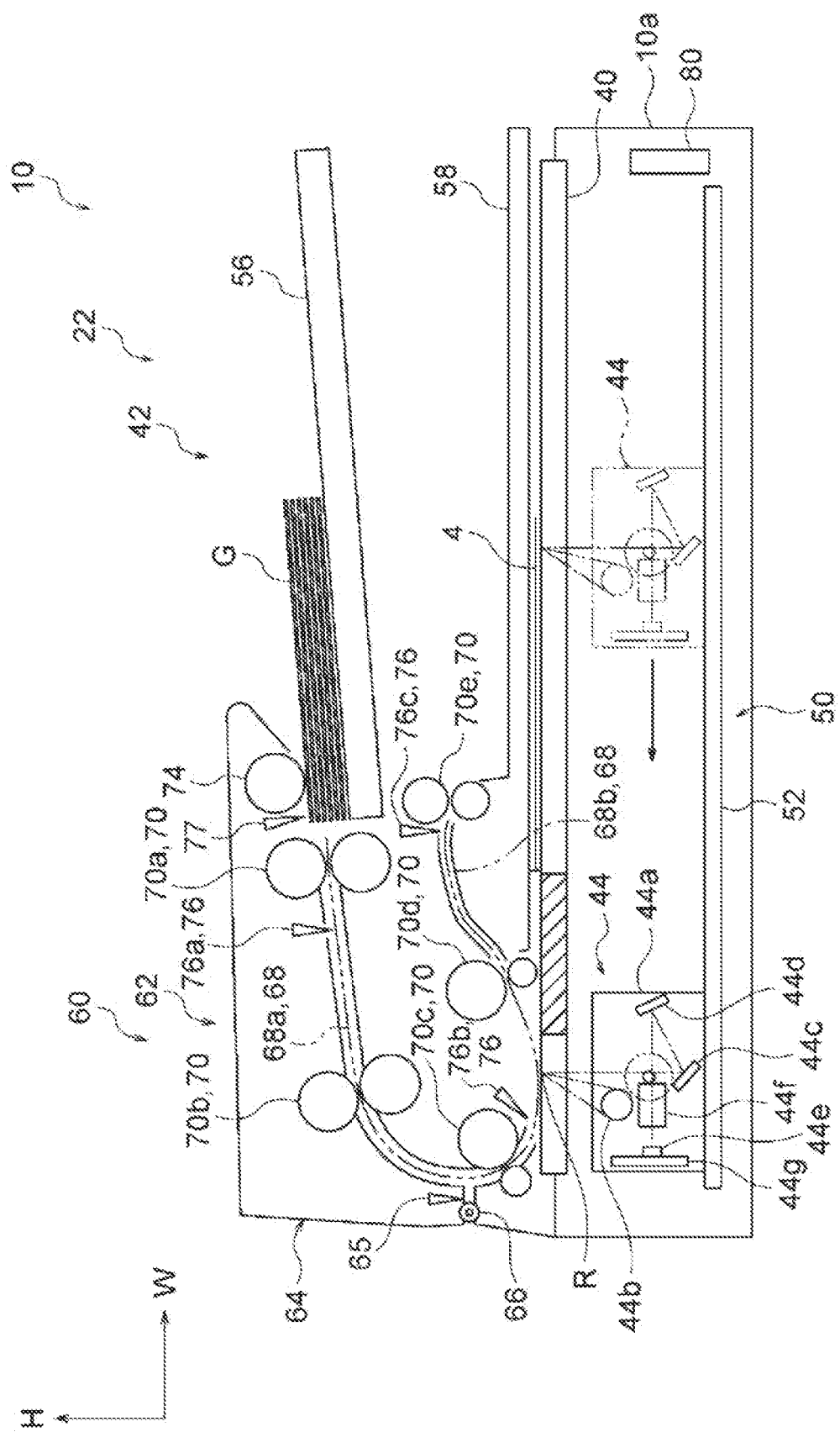
FIG. 3 is a configuration diagram illustrating a reader according to the first exemplary embodiment of the present disclosure.
Figure 4:
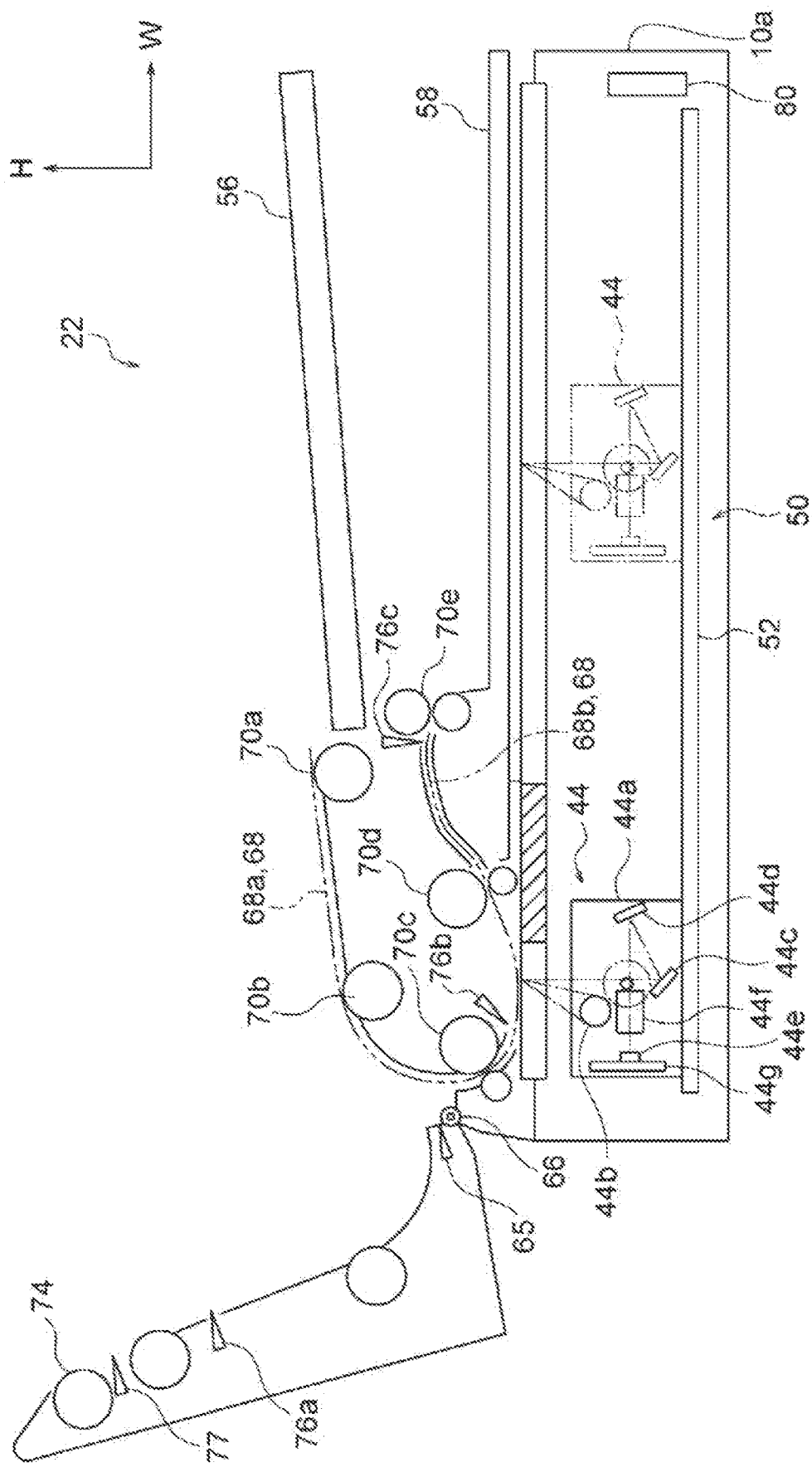
FIG. 4 is a configuration diagram illustrating the reader a state where an opening closing covering part is opened according to the first exemplary embodiment of the present disclosure.

As illustrated in FIG. 3, the reading device 22 includes a document transport device 60 (auto document feeder) that sequentially transports plural stacked documents G, platen glass 40 on which a document G is placed, and a platen covering part 42 that exposes or covers the platen glass 40. Furthermore, the reading device 22 includes a reader 44 that reads an image formed on a document G, a moving unit 50 that moves the reader 44, and a control device 80 (see FIG. 5) that controls each unit.

Platen Glass 40, Platen Covering Part 42

As illustrated in FIG. 3, the platen glass 40 is fitted into an upper part of the apparatus body 10a of the image forming apparatus 10. The platen covering part 42 that exposes or covers the platen glass 40 is disposed above the platen glass 40.

In a state where the platen covering part 42 is opened to expose the platen glass 40, a document G can be placed on the platen glass 40. The document transport device 60 (auto document feeder) is provided on the platen covering part 42.

Reader 44

As illustrated in FIG. 3, the reader 44 is disposed below the platen glass 40 and inside the apparatus body 10a.

The reader 44 includes a housing 44a having a rectangular parallelepiped shape extending in the apparatus depth direction (paper depth direction), a light source 44b, and planar mirrors 44c and 44d that reflect, to a predetermined position, light emitted from the light source 44b and then reflected by the document G. Furthermore, the reader 44 includes a photoelectric conversion element 44e that converts light into an electric signal, an imaging lens 44f that forms an image on the photoelectric conversion element 44e from light reflected by the planar mirrors 44c and 44d, and a reading circuit board 44g on which the photoelectric conversion element 44e is mounted.

In this configuration, the light source 44b provided in the reader 44 emits light toward a document G. The planar mirrors 44c and 44d reflects light reflected by the document G toward the photoelectric conversion element 44e. The imaging lens 44f forms an image on the photoelectric conversion element 44e from the light reflected toward the photoelectric conversion element 44e. Furthermore, the photoelectric conversion element 44e sends image information to the image former 20 (see FIG. 1) through the reading circuit board 44g.

Moving Unit 50

The moving unit 50 includes a pair of rail members 52 that are attached on far and near sides in the apparatus depth direction of the reader 44 and extend in the apparatus width direction as illustrated in FIG. 3 and a driving unit (not illustrated) that moves the reader 44 in the apparatus width direction along the rail members 52.

In this configuration, in a case where an image formed on a document G placed on the platen glass 40 is read by the reader 44, the moving unit 50 moves the reader 44 in the apparatus width direction along the platen glass 40. Meanwhile, in a case where an image formed on a document G transported by the document transport device 60 is read by the reader 44, the moving unit 50 moves the reader 44 to a transport reading position (indicated by the solid light in FIG. 3) that faces a reading position R at which the image formed on the document G transported by the document transport device 60 is read.

Document Transport Device 60

As illustrated in FIG. 3, the document transport device 60 includes a device body 62 disposed on one side (left side in FIG. 3) in the apparatus width direction and a stacking unit 56 that is disposed on the other side (right side in FIG. 3) in the apparatus width direction and on which documents G are stacked. Furthermore, the document transport device 60 includes a feeding roll 74 that feeds the documents G stacked on the stacking unit 56 to the transport path 68 and a drive source 75 (see FIG. 5) that drives the feeding roll 74.

Furthermore, the document transport device 60 includes a stacking sensor 77 that detects the presence or absence of a document G stacked on the stacking unit 56, plural pairs of transport rolls 70 that transport the document G along the transport path 68, and a drive source 72 (see FIG. 5) that drives the plural pairs of transport rolls 70. Furthermore, the document transport device 75 includes plural transport sensors 76 that detects the presence or absence of a transported document G and a discharge unit 58 that is disposed below the stacking unit 56 and into which the document G transported by the transport rolls 70 is discharged.

Feeding Roll 74

As illustrated in FIG. 3, the feeding roll 74 is disposed so as to be in contact with a front end portion of a topmost one of the documents G stacked on the stacking unit 56 in the device body 62. The feeding roll 74 that is rotated by driving force transmitted from the drive source 75 (see FIG. 5) sequentially feeds the documents G stacked on the stacking unit 56 to the transport path 68.

Transport Rolls 70

As illustrated in FIG. 3, the plural pairs of transport rolls 70 are disposed apart from one another along the transport path 68 having a U shape opened on the other side in the apparatus width direction when viewed from the apparatus depth direction in the device body 62. The plural pairs of transport rolls 70 that are rotated by driving force transmitted from the drive source 72 (see FIG. 5) transport the document G fed to the transport path 68 by the feeding roll 74 along the transport path 68. The plural pairs of transport rolls 70, which are rotated by driving force transmitted from the drive source 72 (see FIG. 5), rotate and do not rotate in synchronization with one another. In other words, a situation where only a specific transport roll rotates does not occur.

In the present exemplary embodiment, five pairs of transport rolls 70 are provided. A pair of separation rolls 70a, a pair of first transport rolls 70b, a pair of second transport rolls 70c, a pair of third transport rolls 70d, and a pair of discharge rolls 70e are disposed in this order from an upstream side to a downstream side in a direction in which the document G is transported (hereinafter referred to as a "document transport direction").

Specifically, the separation rolls 70a and the first transport rolls 70b are disposed in an upstream portion 68a of the transport path 68, and the second transport rolls 70c, the third transport rolls 70d, and the discharge rolls 70e are disposed in a downstream portion 68b of the transport path 68. Details of the upstream portion 68a and the downstream portion 68b of the transport path 68 will be described later.

Separation Rolls 70a, First Transport Rolls 70b

The separation rolls 70a are disposed so as to receive documents G from the feeding roll 74 on a downstream side in the document transport direction relative to the feeding roll 74. The separation rolls 70a transport the documents G to the downstream side in the document transport direction one by one so that the documents G are not transported in an overlapping manner.

The first transport rolls 70b are disposed so as to receive a document G from the separation rolls 70a on a downstream side in the document transport direction relative to the separation rolls 70a.

Second Transport Rolls 70c, Third Transport Rolls 70d, Discharge Rolls 70e

The second transport rolls 70c are disposed so as to receive a document G from the first transport rolls 70b on a downstream side relative to the first transport rolls 70b and on an upstream side relative to the reading position R in the document transport direction. In the present exemplary embodiment, the reading position R is located on an upstream side in the document transport direction in the downstream portion 68b of the transport path 68.

The third transport rolls 70d are disposed so as to receive a document G from the second transport rolls 70c on a downstream side in the document transport direction relative to the reading position R. In other words, the third transport rolls 70d are disposed on a side opposite to the second transport rolls 70c with the reading position R interposed therebetween.

The discharge rolls 70e are disposed so as to receive a document G from the third transport rolls 70d on a downstream side in the document transport direction relative to the third transport rolls 70d. The discharge rolls 70e sequentially discharge documents G transported along the transport path 68 to the discharge unit 58.

Device Body 62, Others

As illustrated in FIG. 3, the device body 62 includes an opening closing covering part 64 that exposes an inner part of the device body 62 and a shaft part 66 that rotatably supports the opening closing covering part 64. Furthermore, the device body 62 includes a guide surface (reference sign is omitted) that is disposed on both sides of the transport path 68 when viewed in the apparatus depth direction and guides the transported document G. The opening closing covering part 64 is an example of an opening and closing unit.

In this configuration, by rotationally moving the opening closing covering part 64 about the shaft part 66, the opening closing covering part 64 is moved between an opened position (see FIG. 4) at which the upstream portion 68a of the U-shaped transport path 68 is exposed to an upper side and a closed position (see FIG. 3) at which the upstream portion 68a of the transport path 68 is covered from above. Specifically, the opening closing covering part 64 is disposed at the opened position or the closed position by making contact with a stopper (not illustrated). Note that the device body 62 has the guide surface (not illustrated) that guides the transported document G on both sides of the transport path 68 when viewed in the apparatus depth direction.

The upstream portion 68a of the transport path 68 is a portion of the transport path 68 that is exposed by the opening closing covering part 64 and is a portion of the transport path 68 that includes an opposed portion facing the shaft part 66 in the apparatus width direction and is located on an upstream side in the document transport direction relative to the opposed portion. Meanwhile, the downstream portion 68b of the transport path 68 is a portion of the transport path 68 that is not exposed by the opening closing covering part 64 and is a portion of the transport path 68 that does not include the opposed portion facing the shaft part 66 in the apparatus width direction and is located on a downstream side in the document transport direction relative to the opposed portion.

Furthermore, the document transport device 60 includes an opening closing sensor 65 that detects an opening/closing state of the opening closing covering part 64. The opening closing sensor 65 detects whether the opening closing covering part 64 is disposed at the opened position or disposed at the closed position.

Stacking Sensor 77

The stacking sensor 77 is an optical sensor disposed on a downstream side relative to the feeding roll 74 in the document transport direction in the device body 62 as illustrated in FIG. 3 and detects the presence or absence of a document G stacked on the stacking unit 56.

Transport Sensors 76

The transport sensors 76 are optical sensors disposed apart from one another so as to face the U-shaped transport path 68 when viewed in the apparatus depth direction in the device body 62, as illustrated in FIG. 3. The transport sensors 76 detect the presence or absence of a document G in opposed portions of the transport path 68. The transport sensors 76 are an example of detectors.

Three transport sensors 76 are provided. Specifically, an upstream sensor 76a, a registration sensor 76b, and a discharge sensor 76c are disposed in this order from an upstream side toward a downstream side in the document transport direction. The discharge sensor 76c is an example of a discharge detector.

Specifically, the upstream sensor 76a is disposed in the upstream portion 68a of the transport path 68 on a downstream side relative to the separation rolls 70a and on an upstream side relative to the first transport rolls 70b in the document transport direction. The registration sensor 76b is disposed in the downstream portion 68b of the transport path 68 on a downstream side relative to the second transport rolls 70c and on an upstream side relative to the reading position R in the document transport direction. The discharge sensor 76c is disposed in the downstream portion 68b of the transport path 68 on an upstream side relative to the discharge rolls 70e and close to the discharge rolls 70e in the document transport direction.

Control Device 80

Figure 6:
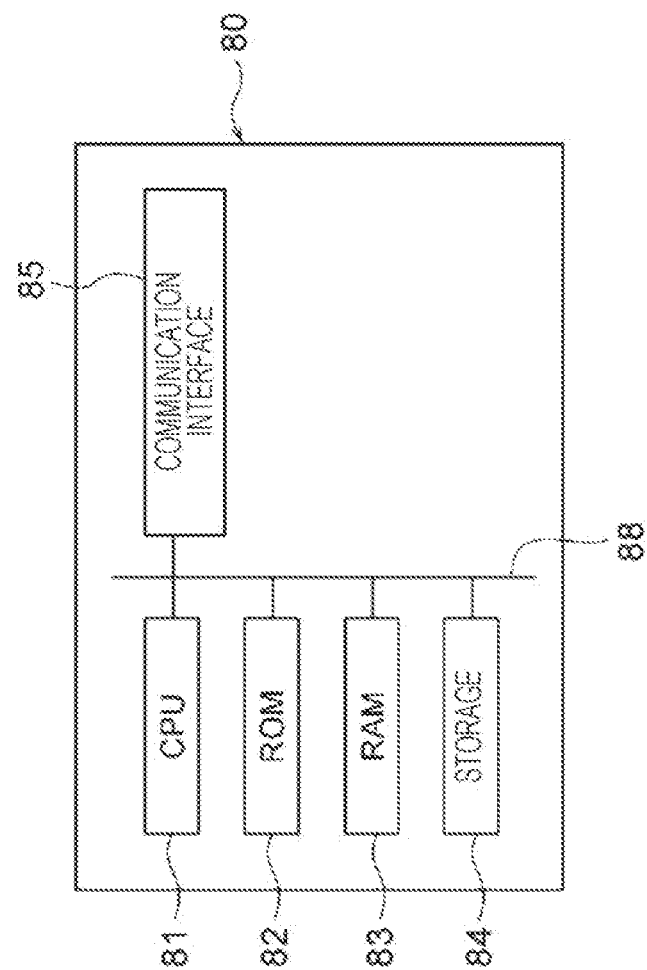
FIG. 6 is a configuration diagram illustrating a configuration of the control device provided in the reader according to the first exemplary embodiment of the present disclosure.

As illustrated in FIG. 6, the control device 80 includes a central processing unit (CPU) 81, a read only memory (ROM) 82, a random access memory (RAM) 83, a storage 84, and a communication interface (I/F) 85. These constituent elements are communicably connected to one another through a bus 88.

The CPU 81 is a central processing unit, and executes various programs and controls each unit. Specifically, the CPU 81 reads out a program from the ROM 82 or the storage 84 and executes the program while using the RAM 83 as a work region. The CPU 81 controls the constituent elements and perform various kinds of arithmetic processing in accordance with a program recorded in the ROM 82 or the storage 84. In the present exemplary embodiment, a control program executed in a case where a document G is jammed inside the device body 62 is stored in the ROM 82 or the storage 84.

Figure 5:
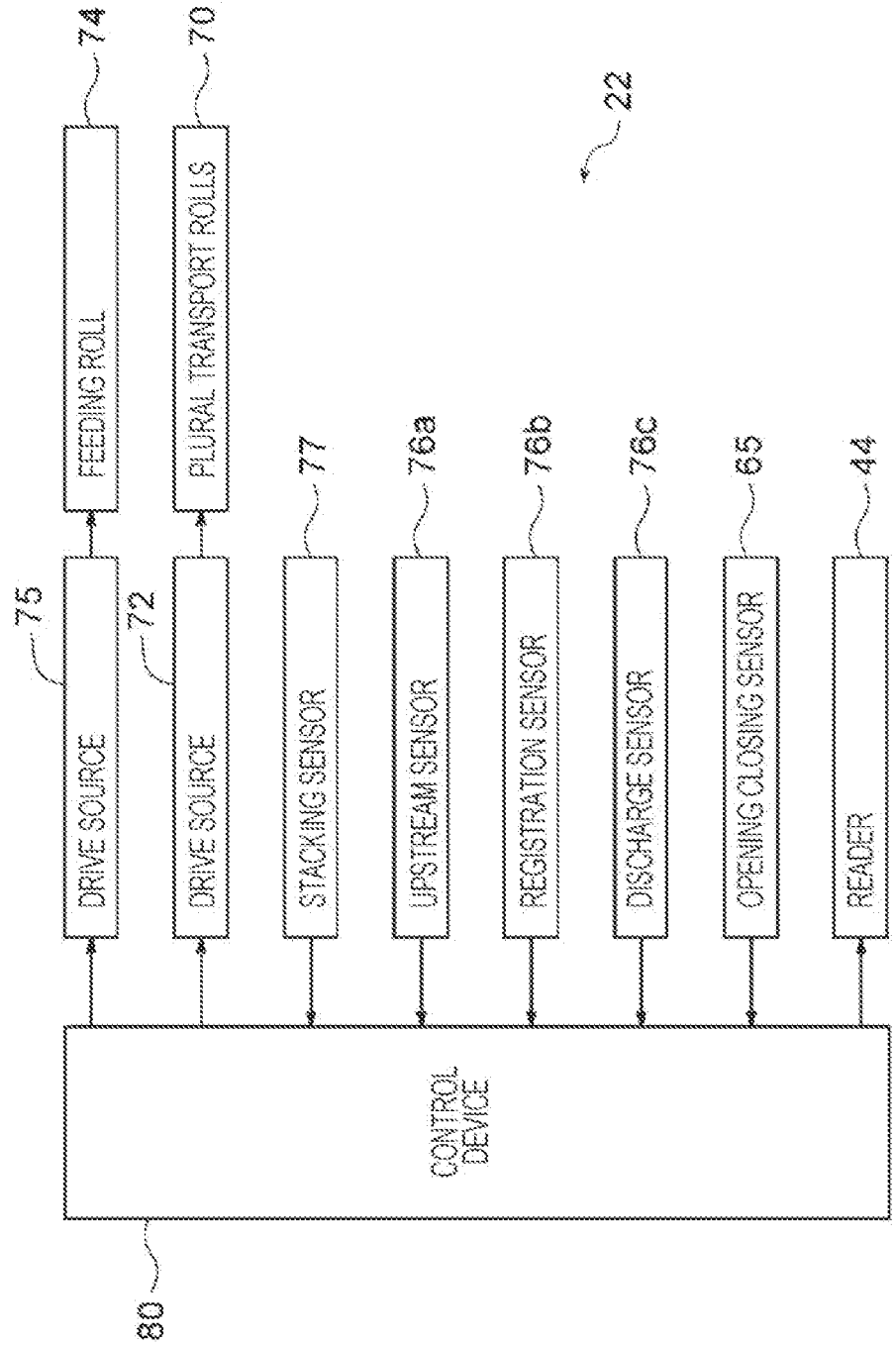
FIG. 5 is a functional block diagram illustrating functions of a control device provided in the reader according to the first exemplary embodiment of the present disclosure.

As illustrated in FIG. 5, the control device 80 acquires detection information from each unit. For example, the control device 80 derives a length of a transported document G in the transport direction from a result of detection of the upstream sensor 76a. Furthermore, the control device 80 controls the reader 44 to read a document G in accordance with a result of detection of the registration sensor 76b. Furthermore, the control device 80 controls the drive source 72 to rotate the transport rolls 70. The control device 80 is an example of a controller.

Note that other constituent elements of the control device 80 are described together with operation thereof that will be described later.

Operation of Substantial Part

Next, operation of the reading device 22 is described. Specifically, how each unit operates when the reading device 22 illustrated in FIG. 3 reads an image formed on a document G stacked on the stacking unit 56 is described. More specifically, operation of each unit of the reading device 22 in an ordinary state in which images formed on transported documents G are sequentially read and operation of each unit of the reading device 22 in a jammed state in which a document G is jammed inside the device body 62 are separately described.

Note that the control device 80 controls each unit, and thereby operation of each unit described below is executed. In a case where the reading device 22 is given no instruction to read an image, the drive sources 72 and 75 do not operate, and the reader 44 is disposed at the transport reading position that faces the reading position R at which an image is read.

Ordinary State

As illustrated in FIG. 3, when plural documents G are placed on the stacking unit 56 by a user, the stacking sensor 77 detects the documents G stacked on the stacking unit 56. Furthermore, when the user gives an instruction to read an image on a user interface (UI) (not illustrated), the control device 80 illustrated in FIG. 5 causes the drive source 75 to operate and thereby rotates the feeding roll 74. Furthermore, the control device 80 causes the drive source 72 to operate and thereby rotates all of the transport rolls 70.

Figure 7:
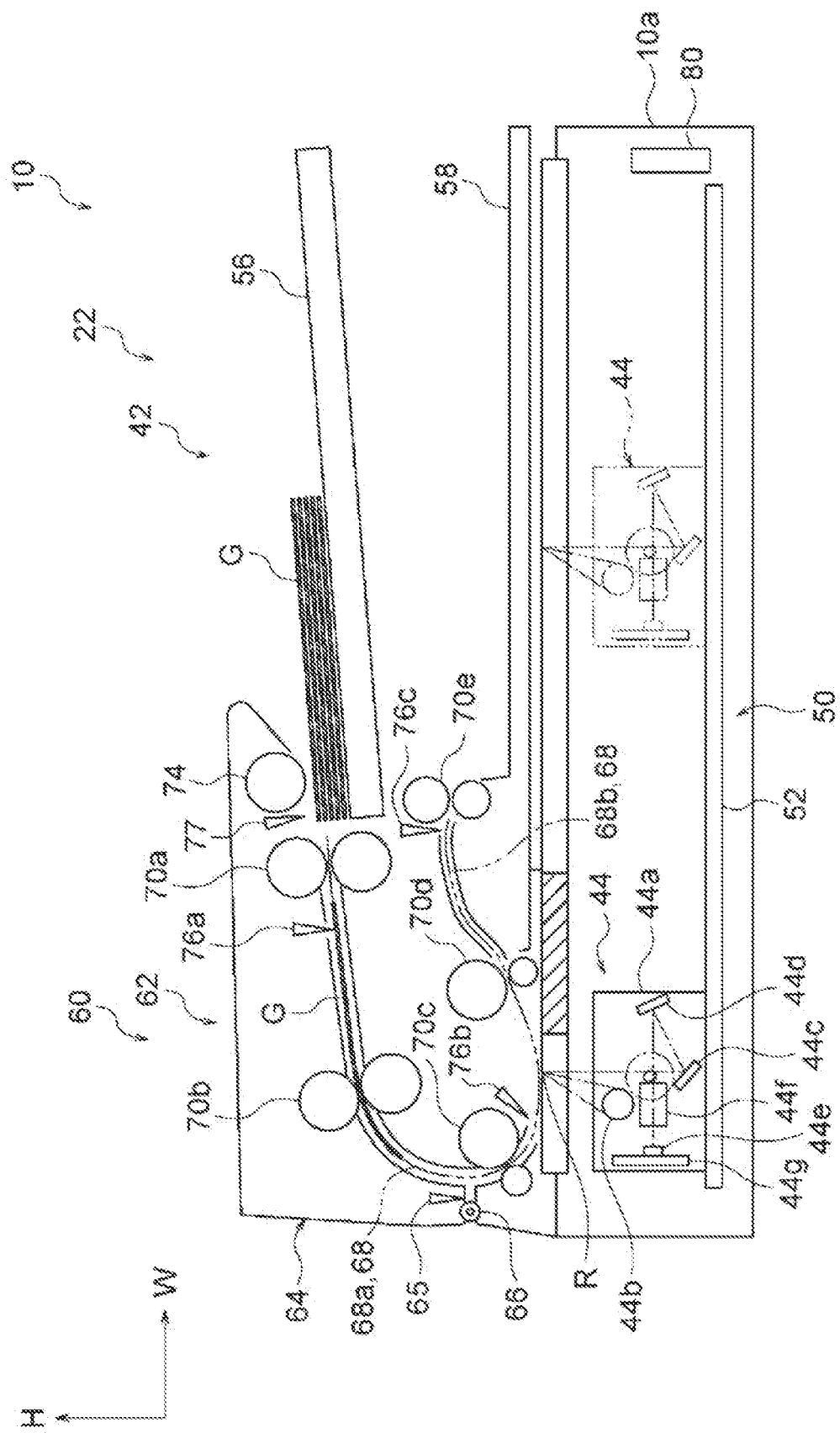
FIG. 7 is a state diagram illustrating a state where a document is transported in the reader according to the first exemplary embodiment of the present disclosure.

As a result, the rotating feeding roll 74 feeds a topmost document G to the transport path 68, as illustrated in FIG. 7. Furthermore, the rotating separation rolls 70a receive the document G fed to the transport path 68. In a case where the separation rolls 70a receive overlapping documents G, the separation rolls 70a transport only a single document G to a downstream side in the document transport direction. Note that when the separation rolls 70a receive the document G from the feeding roll 74, driving force transmitted from the drive source 75 to the feeding roll 74 stops.

Furthermore, the rotating first transport rolls 70b receive the document G from the separation rolls 70a and transports the received document G to a downstream side in the document transport direction. The upstream sensor 76a disposed between the separation rolls 70a and the first transport rolls 70b in the transport path 68 detects the transported document G. The control device 80 derives a length of the document G in the transport direction on the basis of a period for which the document G is being detected by the upstream sensor 76a. The control device 80 derives a length of a document G in the transport direction every time the upstream sensor 76a detects a document G.

Note that the length of the document G acquired by the upstream sensor 76a is stored in the ROM 82 illustrated in FIG. 6.

Figure 8:
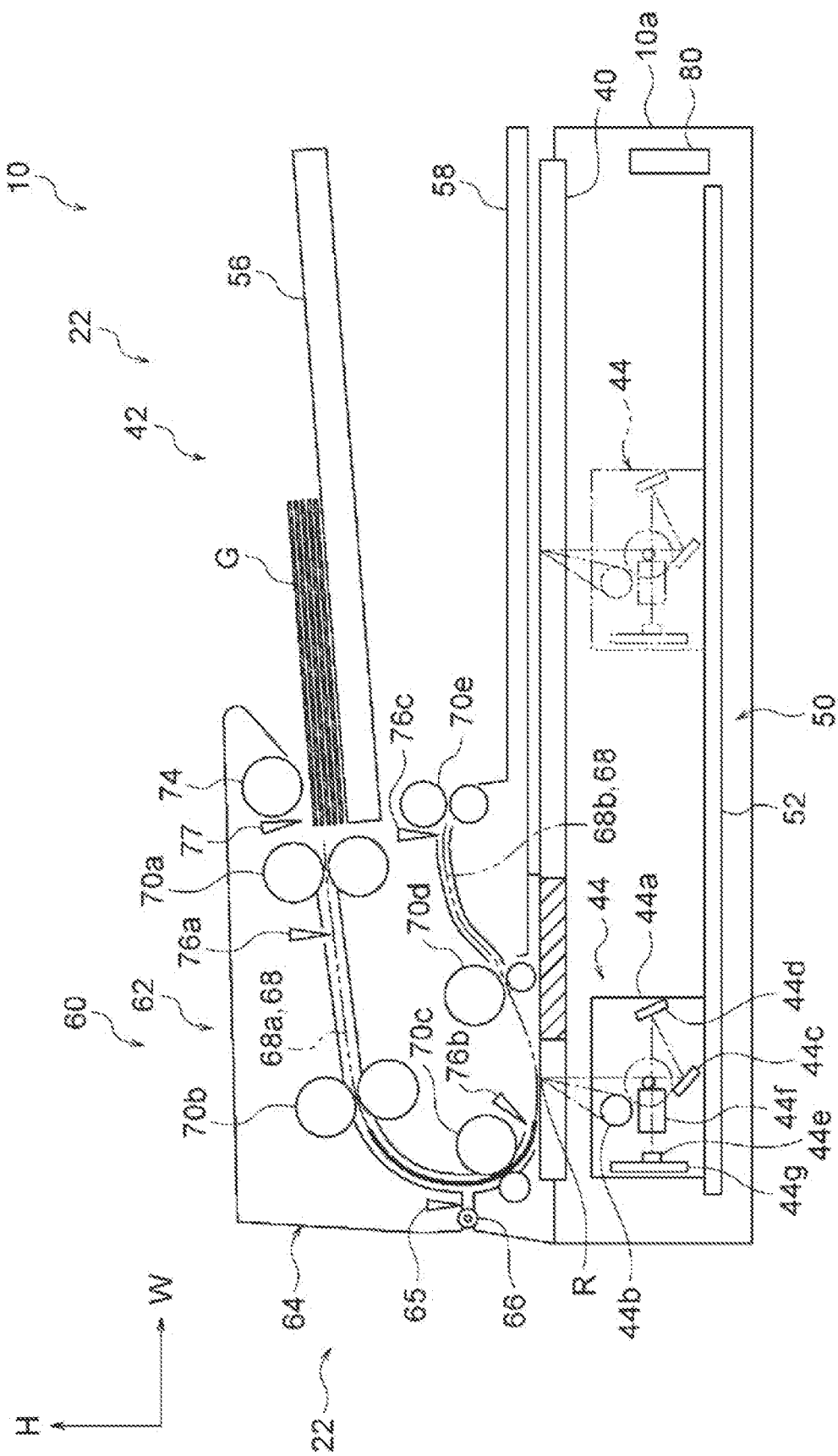
FIG. 8 is a state diagram illustrating a state where a document is transported in the reader according to the first exemplary embodiment of the present disclosure.

Furthermore, the rotating second transport rolls 70c receive the document G from the first transport rolls 70b and transport the received document G to a downstream side in the document transport direction, as illustrated in FIG. 8. The registration sensor 76b disposed between the second transport rolls 70c and the reading position R in the transport path 68 detects the transported document G. The control device 80 controls the reader 44 to read an image formed on the document G on the basis of a timing at which the document G is detected by the registration sensor 76b.

Figure 9:
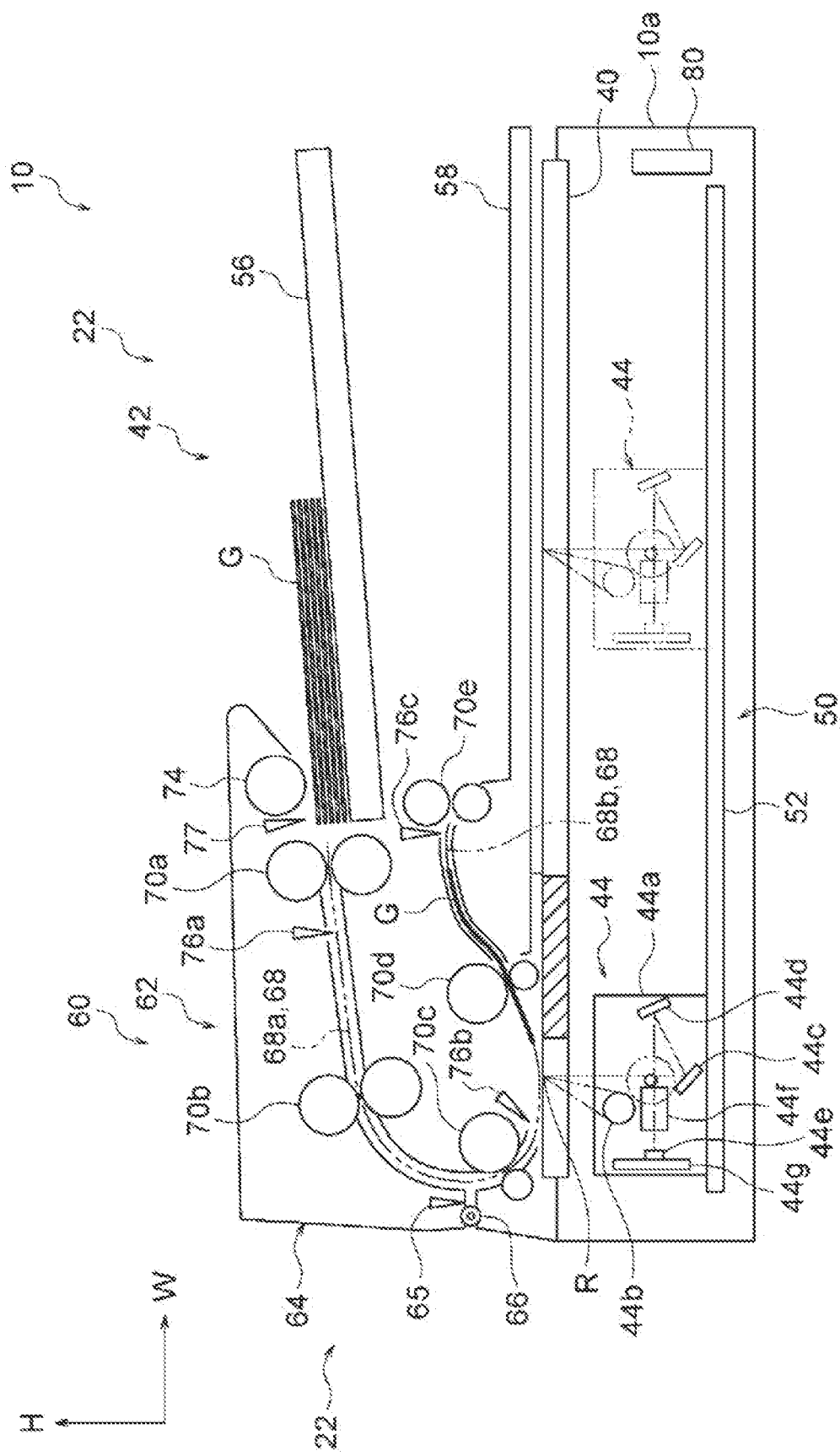
FIG. 9 is a state diagram illustrating a state where a document is transported in the reader according to the first exemplary embodiment of the present disclosure.

Furthermore, the rotating third transport rolls 70d receive the document G from the second transport rolls 70c and transport the received document G to a downstream side in the document transport direction, as illustrated in FIG. 9. Then, the discharge sensor 76c detects the document G transported to the downstream side in the document transport direction by the third transport rolls 70d.

Figure 10:
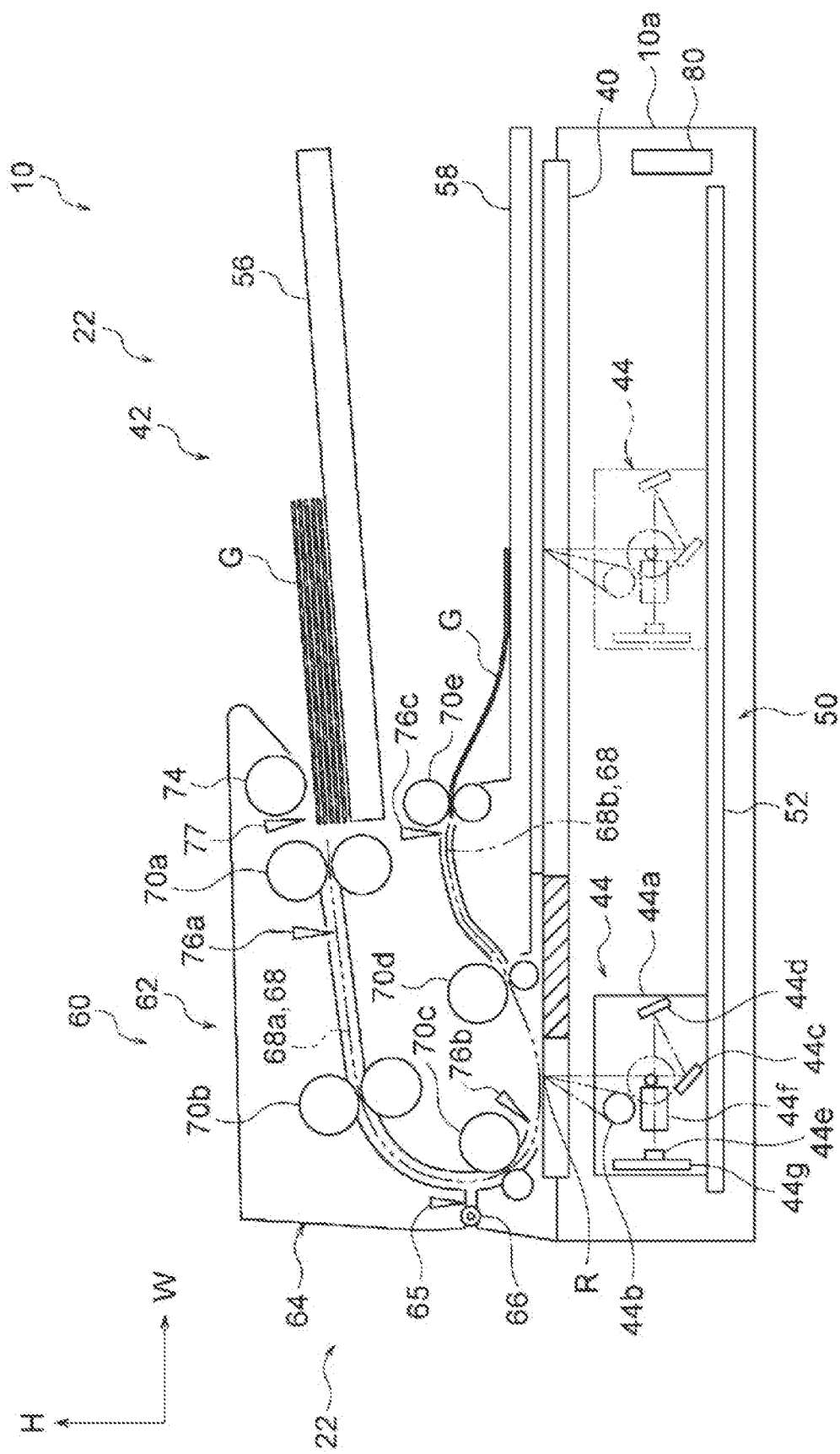
FIG. 10 is a state diagram illustrating a state where a document is transported in the reader according to the first exemplary embodiment of the present disclosure.
Figure 11:
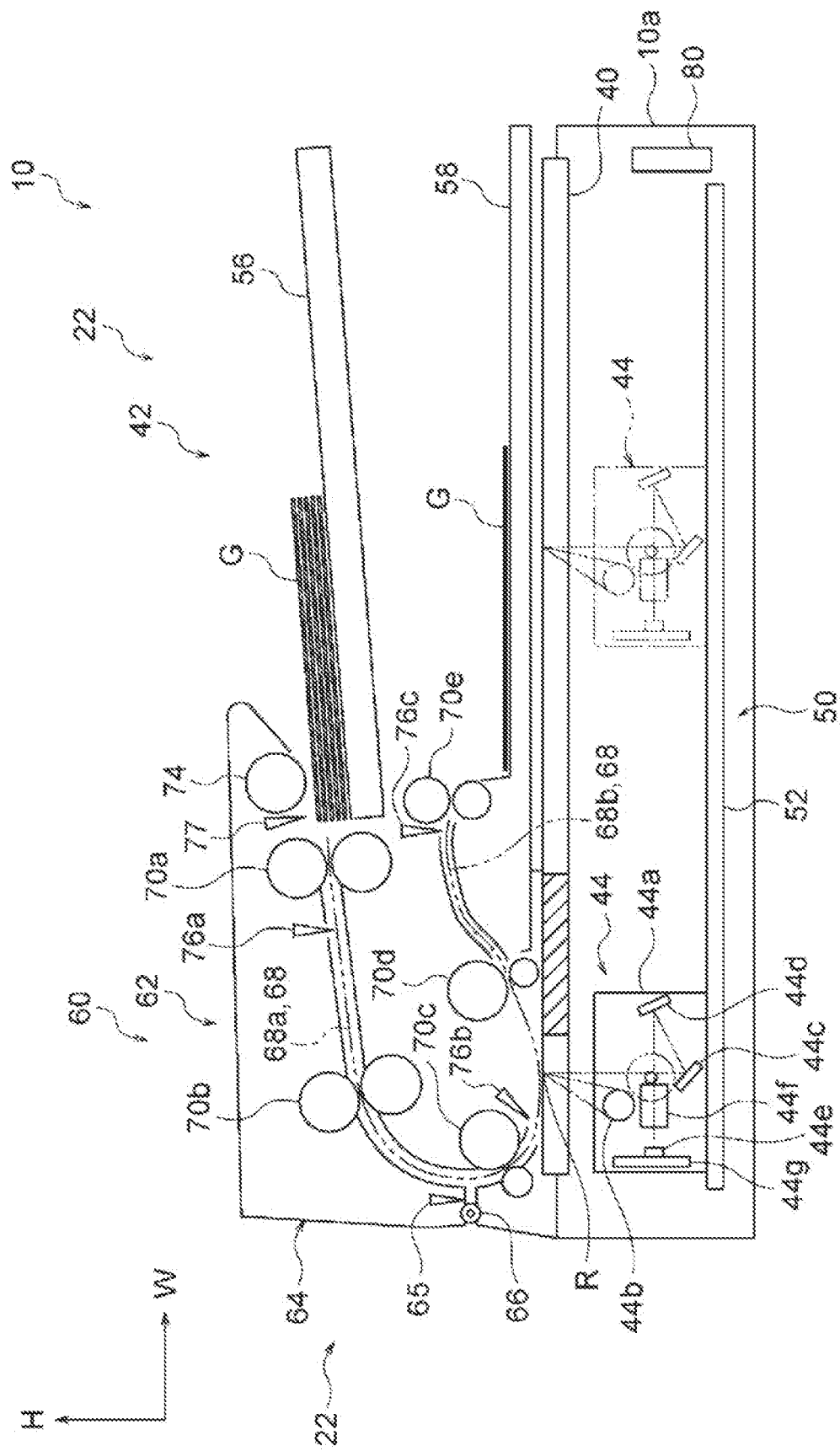
FIG. 11 is a state diagram illustrating a state where a document is transported in the reader according to the first exemplary embodiment of the present disclosure.

Furthermore, the rotating discharge rolls 70e receive the document G from the third transport rolls 70d and discharge the received document G to the discharge unit 58, as illustrated in FIGS. 10 and 11.

Furthermore, the control device 80 causes the drive source 75 to operate and thereby rotates the feeding roll 74 at a timing at which the previously transported document G passes the registration sensor 76b, thereby feeding a topmost document G to the transport path 68, as illustrated in FIG. 7. By repeating the above processes, the reader 44 sequentially reads images formed on the documents G stacked on the stacking unit 56.

Jammed State

A document G transported in the ordinary state is sometimes jammed inside the device body 62. Specifically, in a case where a period for which a document G is being detected by the upstream sensor 76a, the registration sensor 76b, or the discharge sensor 76c is equal to or longer than a threshold period, the control device 80 determines that a document jam has occurred. Furthermore, in a case where a period from detection of a document G by an upstream one of the transport sensors 76 in the document transport direction to detection of the document G by a downstream one of the transport sensors 76 in the document transport direction is equal to or longer than a threshold period, the control device 80 determines that a document jam has occurred.

Figure 12:
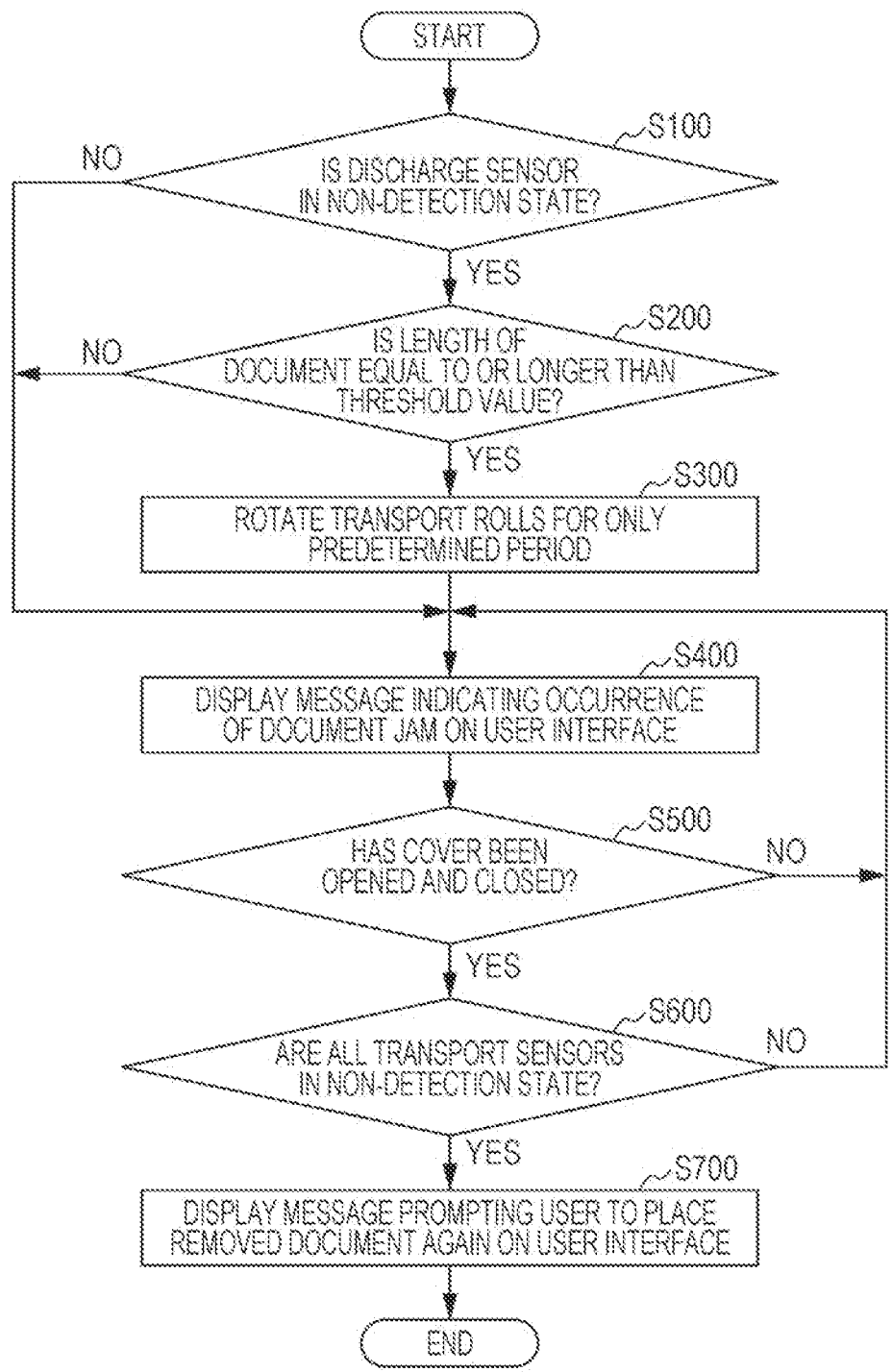
FIG. 12 is an operation flowchart of a case where a document jam occurs in the reader according to the first exemplary embodiment of the present disclosure.

The following describes how each unit operates in a case where the control device 80 determines that a document jam has occurred according to the flowchart illustrated in FIG. 12. In a case where it is determined that a document jam has occurred, the control device 80 stops rotation of all of the transport rolls 70 by deactivating the drive source 72. Then, step S100 is performed.

In step S100, the control device 80 determines whether or not the discharge sensor 76c is in a non-detection state where no document G is being detected. In a case where the discharge sensor 76c is in the non-detection state, step S200 is performed. In a case where the discharge sensor 76c is not in the non-detection state (is in a detection state), step S400 is performed.

In step S200, the control device 80 determines whether or not a length of a transported document G is equal to or longer than a threshold value. Specifically, the control device 80 determines that the length of the document G in the transport direction is equal to or longer than the threshold length in a case where the length of the document G in the transport direction is longer by a predetermined length or more than a longest roll-to-roll distance among distances between pairs of transport rolls 70 adjacent in the document transport direction. Furthermore, the control device 80 determines that the length of the document G in the transport direction is less than the threshold length in a case where the length of the document G in the transport direction is not longer by the predetermined length or more than the longest roll-to-roll distance among distances between pairs of transport rolls 70 adjacent in the document transport direction.

In the present exemplary embodiment, the longest roll-to-roll distance is a distance between the separation rolls 70a and the first transport rolls 70b. For example, in a case where the length of the document G is 140 or longer assuming that the distance between the separation rolls 70a and the first transport rolls 70b is 100, the control device 80 determines that the length of the document G in the transport direction is equal to or longer than the threshold length. In other words, the control device 80 determines that the length of the document G in the transport direction is not less than the threshold length.

In a case where the length of the document G in the transport direction is equal to or longer than the threshold length, step S300 is performed. In a case where the length of the document G in the transport direction is less than the threshold length, step S400 is performed.

In step S300, the control device 80 controls the drive source 72 to rotate all of the transport rolls 70 for only a predetermined period.

The "predetermined period" is described below. As illustrated in FIG. 10, in a case where the control device 80 determines that a document jam has occurred in a state where a document G has passed the discharge sensor 76c but is held between the discharge rolls 70e, all of the transport rolls 70 including the discharge rolls 70e stop. That is, a document G that has passed the reading position R and whose image has been read is held between the discharge rolls 70e and is not discharged to the discharge unit 58 in some cases. A user may think that such a document G that has not been discharged to the discharge unit 58 is a document G whose image has not been read and may place the document G on the stacking unit 56 again.

In order to avoid such a situation, all of the transport rolls 70 including the discharge rolls 70e are rotated for a period it takes for the document G that has passed the discharge sensor 76c and is being held between the discharge rolls 70e to be discharged to the discharge unit 58. That is, the "predetermined period" is the "period it takes for the document G that has passed the discharge sensor 76c and is being held between the discharge rolls 70e to be discharged to the discharge unit 58". Note that this period is stored in advance in the ROM 82 illustrated in FIG. 6. The predetermined period is, for example, a period it takes for one of the discharge rolls 70e that has a larger diameter to make a half turn. Although the period is used as an expression, the period has the same meaning as an "amount": a half turn and has the same meaning as a "length": a half of a circumference of the roll.

The following describes a reason why the control device 80 rotates the transport rolls 70 for only a predetermined period only in a case where the length of the document G is equal to or longer than the threshold length. Specifically, a reading device 522 according to a comparative example in which a control device 580 rotates the transport rolls 70 for only a predetermined period irrespective of a length of a document G is described with reference to FIGS. 13 and 14. As for the reading device 522 according to the comparative example, parts different from those of the reading device 22 are mainly described.

In the reading device 522, all of the transport rolls 70 rotate and do not rotate in synchronization with one another. Accordingly, when the discharge rolls 70e are rotated, other transport rolls 70 also rotate. For example, in a case where it is determined that a document jam has occurred, a document G is stopped in some cases on the transport path 68 so that a rear end portion thereof is located in the upstream portion 68a of the transport path 68 and a front end portion thereof is located in the downstream portion 68b of the transport path 68, as illustrated in FIG. 13.

In the reading device 522 according to the comparative example, the control device 580 rotates all of the transport rolls 70 for only a predetermined period irrespective of a length of the document G. That is, the control device 580 rotates all of the transport rolls 70 even in a case where the length of the document G in the transport direction is less than the threshold value. As a result, in a case where there is a document G that has passed the discharge sensor 76c and is held between the discharge rolls 70e, this document G is discharged to the discharge unit 58.

Figure 13:
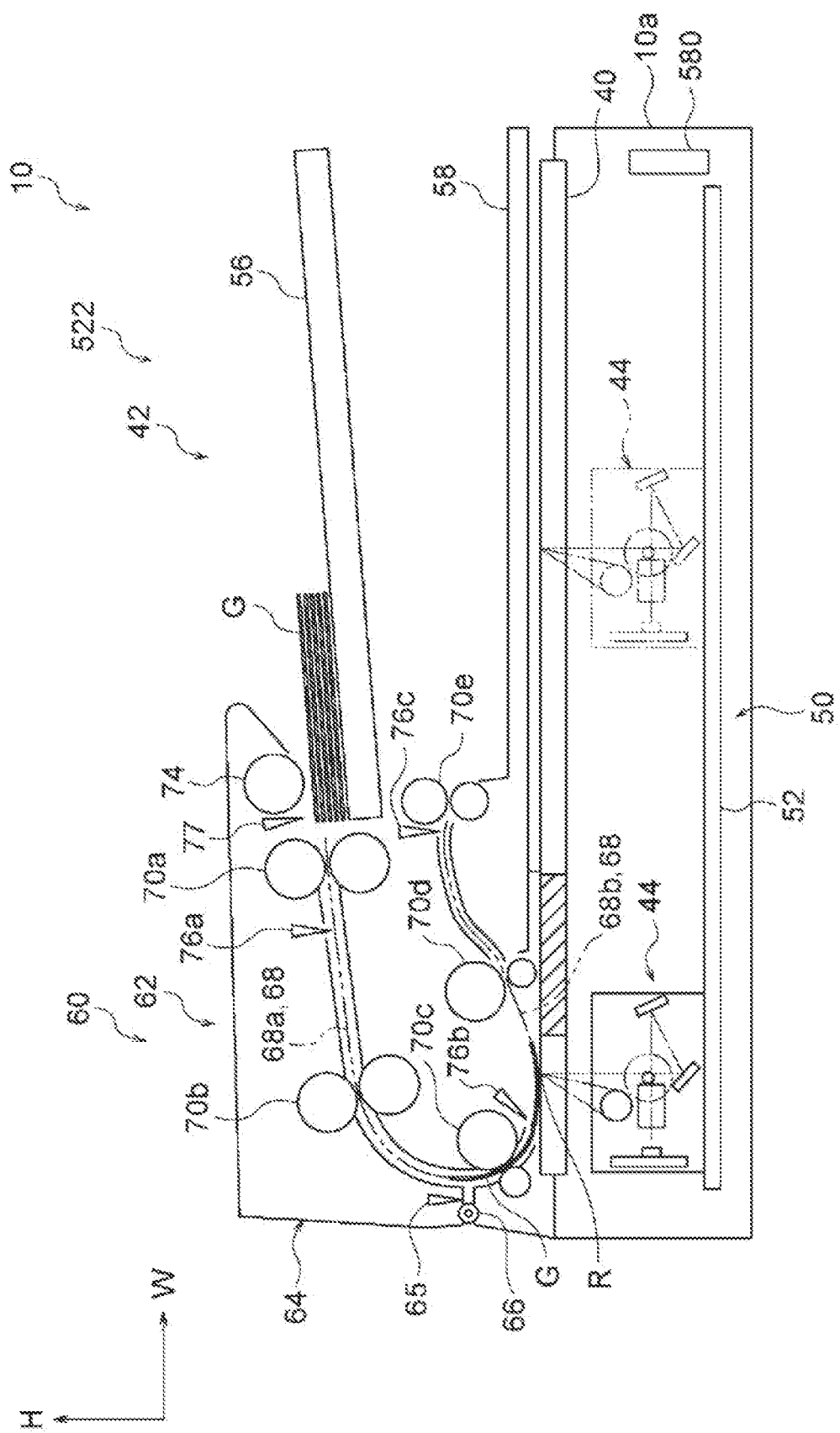
FIG. 13 is a state diagram illustrating a state where a document is transported in a reader according to a comparative example for comparison with the first exemplary embodiment of the present disclosure.
Figure 14:
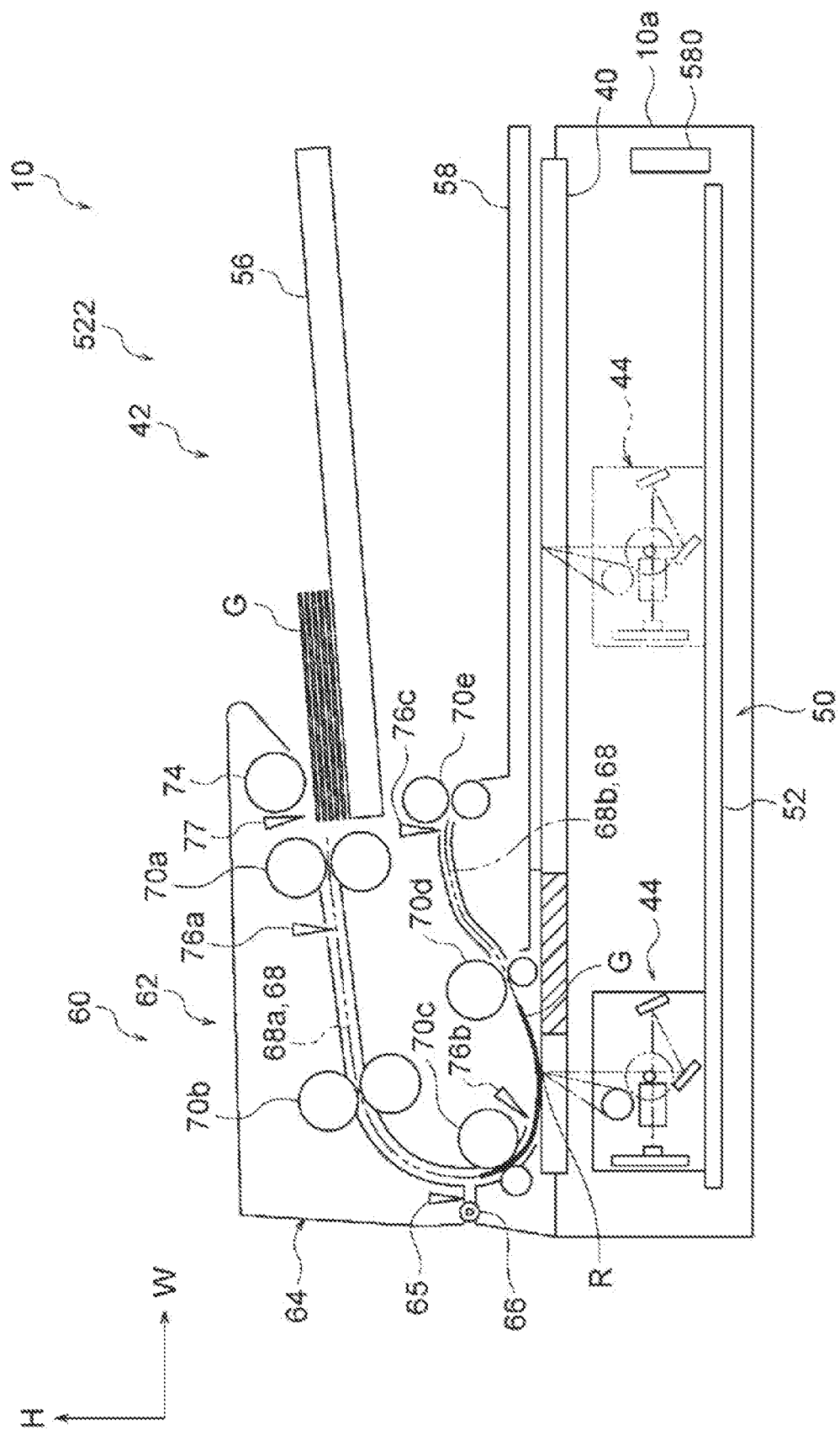
FIG. 14 is a state diagram illustrating a state where a document is transported in the reader according to a comparative example for comparison with the first exemplary embodiment of the present disclosure.

However, in a case where all of the transport rolls 70 are rotated even in a case where the length of the document G in the transport direction is less than the threshold value, the whole document G stopped on the transport path 68 may undesirably moves to the downstream portion 68b of the transport path 68, as illustrated in FIGS. 13 and 14.

As described above, in a case where the length of the document G in the transport direction is less than the threshold value, the whole document G moves to the downstream portion 68b of the transport path 68, which is not exposed even when the opening closing covering part 64 is placed at the opened position. When the whole document G moves to the downstream portion 68b of the transport path 68, it becomes hard to remove this document G even by placing the opening closing covering part 64 at the opened position.

In the present exemplary embodiment, in order to avoid such a situation, the transport rolls 70 are rotated only in a case where the length of the document G in the transport direction is equal to or longer than the threshold length. In the present exemplary embodiment, step S400 is performed after all of the transport rolls 70 are rotated for only the predetermined period.

In step S400, the control device 80 displays a message indicating occurrence of a document jam on the user interface. Then, step S500 is performed.

In step S500, the control device 80 determines whether or not the opening closing covering part 64 has been opened and closed. Opening and closing of the opening closing covering part 64 are detected by the opening closing sensor 65 illustrated in FIGS. 3 and 4. Specifically, the user who has seen the message indicating occurrence of a document jam removes the jammed document G by opening the opening closing covering part 64 and closes the opening closing covering part 64 after removing the document G. For this reason, the control device 80 determines whether or not the opening closing covering part 64 has been opened and closed. In a case where the opening closing covering part 64 has been opened and closed, step S600 is performed. In a case where the opening closing covering part 64 has not been opened and closed, step S400 is performed, in which the control device 80 maintains a state where the message indicating occurrence of a document jam is displayed on the user interface.

In step S600, the control device 80 determines whether or not all of the transport sensors 76 are in the non-detection state where no document G is being detected. In a case where all of the transport sensors 76 are in the non-detection state, step S700 is performed. In a case where any of the transport sensors 76 is in a detection state where a document G is being detected, step S400 is performed, in which the control device 80 maintains a state where the message indicating occurrence of a document jam is displayed on the user interface.

In step S700, the control device 80 displays a message prompting the user to place the removed document G on the stacking unit 56 again on the user interface, and then ends the series of operations.

In a case where the discharge sensor 76c is not in the non-detection state (is in the detection state) in step S100, step S400 is performed, in which a message indicating occurrence of a document jam is displayed on the user interface, and then step S500 is performed.

Furthermore, in a case where it is determined in step S200 that the length of the document G is less than the threshold length, step S400 is performed, in which a message indicating occurrence of a document jam is displayed on the user interface, and then step S500 is performed.

Summary

As described above, in the reading device 22, all of the transport rolls 70 including the discharge rolls 70e are rotated for only the predetermined period upon occurrence of a document jam in a case where a length of the document G in the transport direction is equal to or longer than the threshold length. Accordingly, in the configuration in which plural pairs of transport rolls rotate and do not rotate in synchronization with one another, it becomes less likely that a state where the document G having a length equal to or longer than the threshold value is held between the discharge rolls 70e is maintained than in a case where a state where the plural pairs of transport rolls are stopped is maintained upon occurrence of a document jam.

Furthermore, in the reading device 22, all of the transport rolls 70 including the discharge rolls 70e are rotated upon occurrence of a document jam in a case where a length of the document G in the transport direction is equal to or longer than the threshold length. Accordingly, it becomes less likely that the whole document G whose length in the transport direction is less than the threshold value moves to the downstream portion 68b of the transport path 68. In other words, in a case where the length of the document G in the transport direction is less than the threshold value, a state where all of the transport rolls 70 including the discharge rolls 70e are stopped is maintained, and therefore the document G whose length in the transport direction is less than the threshold value can be easily removed by opening the opening closing covering part 64.

Furthermore, in the reading device 22, the control device 80 determines that the length of the document G in the transport direction is equal to or longer than the threshold length in a case where the length of the document G in the transport direction is longer by a predetermined length or more than a longest roll-to-roll distance among distances between pairs of transport rolls 70 adjacent in the document transport direction. The roll-to-roll distance is determined in consideration of a shortest document G from which an image can be read by the reading device 22. Therefore, a threshold length appropriate for each reading device is determined as compared with a case where the threshold length is always constant irrespective of the roll-to-roll distance.

Furthermore, in the image forming apparatus 10, in a case where a document jam occurs, a document G whose length in the transport direction is less than the threshold value remains at a position where the document G is easy to remove, and therefore maintenance becomes easier than a case where the reading device 22 is not provided.

Second Exemplary Embodiment

Figure 15:
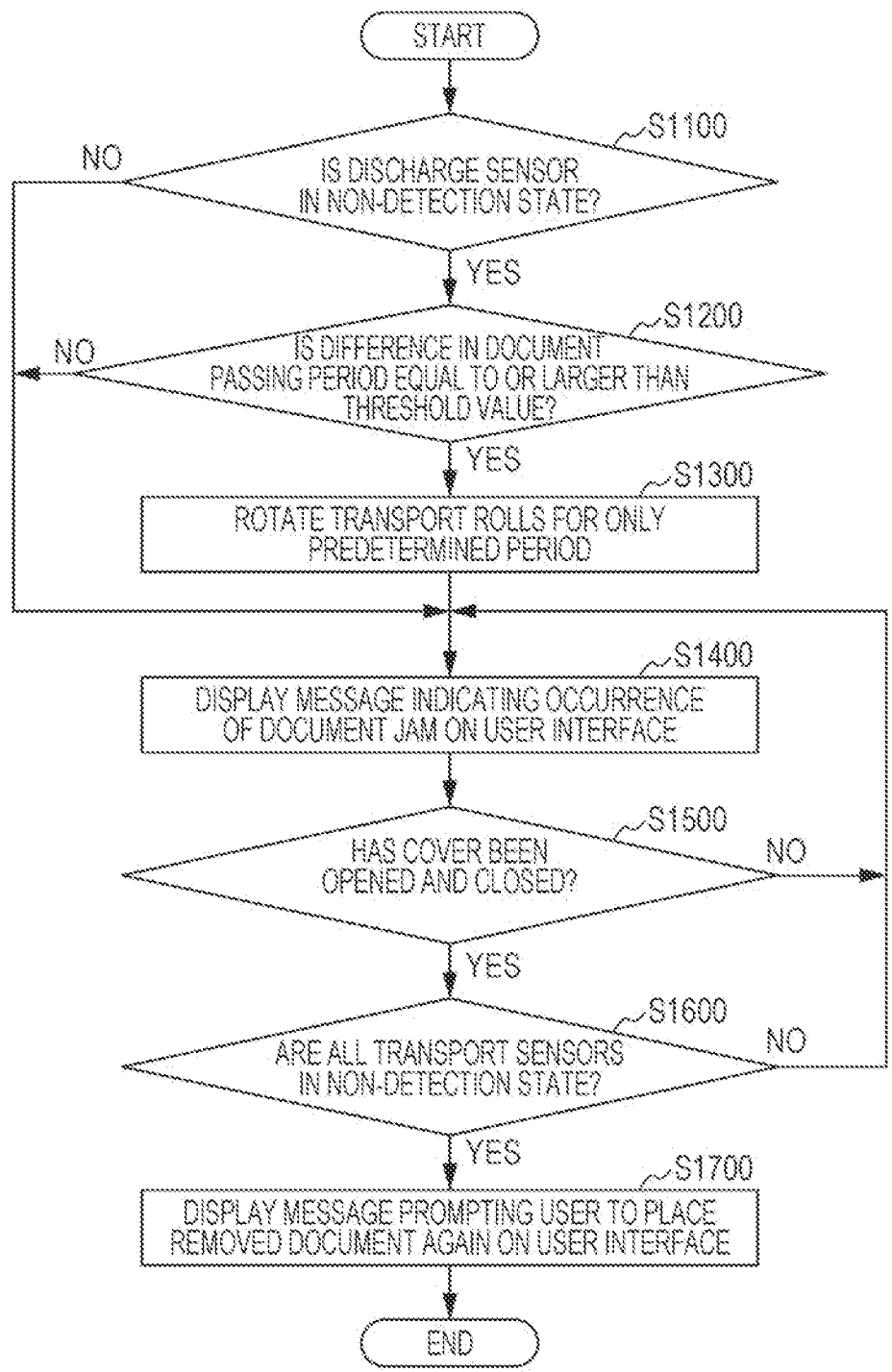
FIG. 15 is an operation flowchart of a case where a document jam occurs in a reader according to a second exemplary embodiment of the present disclosure.

Next, an example of a reading device and an image forming apparatus according to a second exemplary embodiment of the present disclosure is described with reference to FIGS. 15 to 17. In the second exemplary embodiment, differences from the first exemplary embodiment are mainly described.

A control device 180 (see FIG. 17) provided in a reading device 122 according to the second exemplary embodiment controls each unit. The following describes how each unit operates in a case where the control device 180 determines that a document jam has occurred with reference to the flowchart illustrated in FIG. 15.

Jammed State

In a case where the control device 180 determines that a document jam has occurred, the control device 180 stops all transport rolls 70 by deactivating a drive source 72. Then, step S1100 is performed.

In step S1100, the control device 180 determines whether or not a discharge sensor 76c is in a non-detection state. In a case where the discharge sensor 76c is in the non-detection state, step S1200 is performed. In a case where the discharge sensor 76c is not in the non-detection state (is in a detection state), step S1400 is performed.

Figure 16:
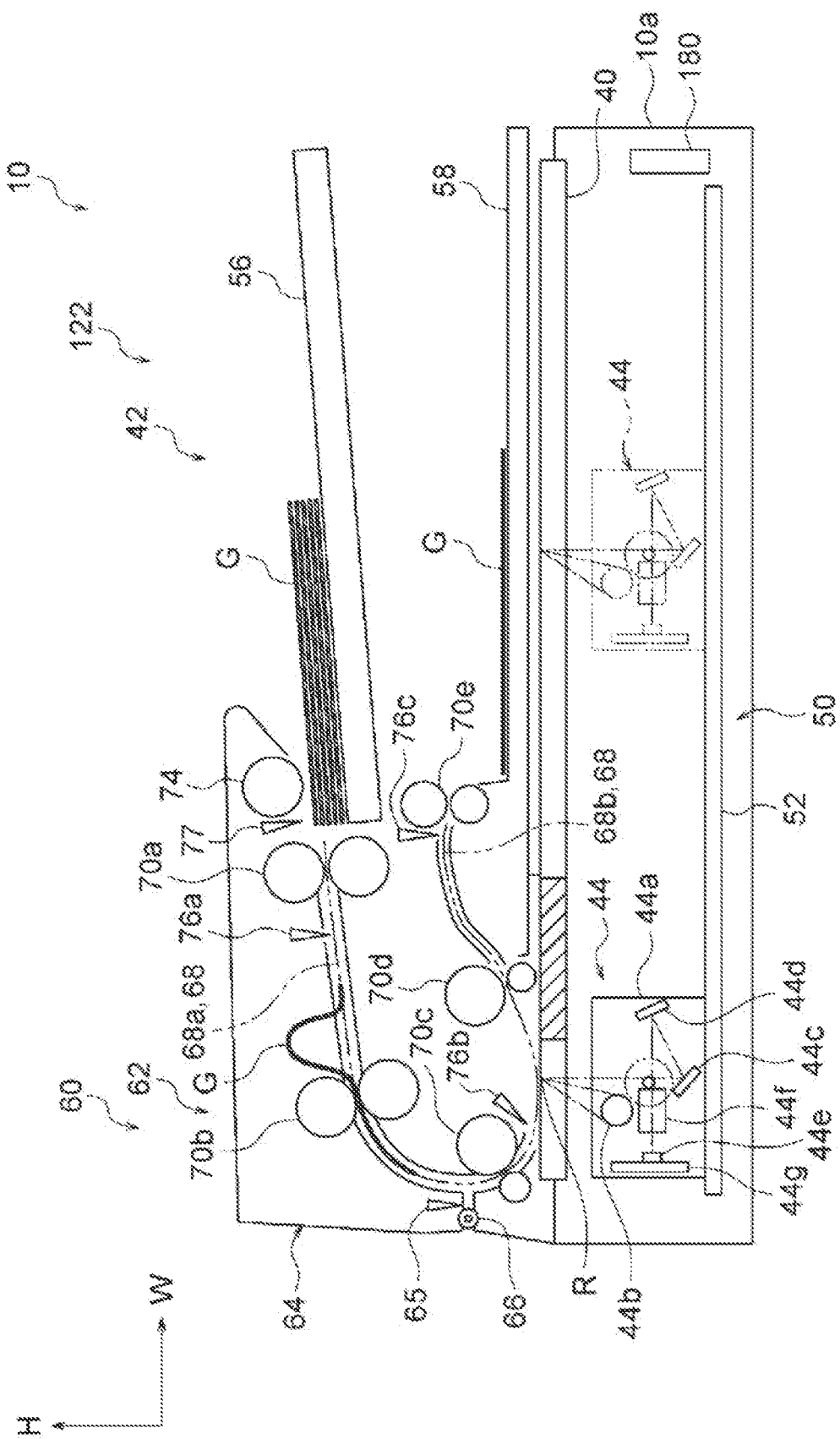
FIG. 16 is a state diagram illustrating a state where a document is transported in the reader according to the second exemplary embodiment of the present disclosure.
Figure 17:
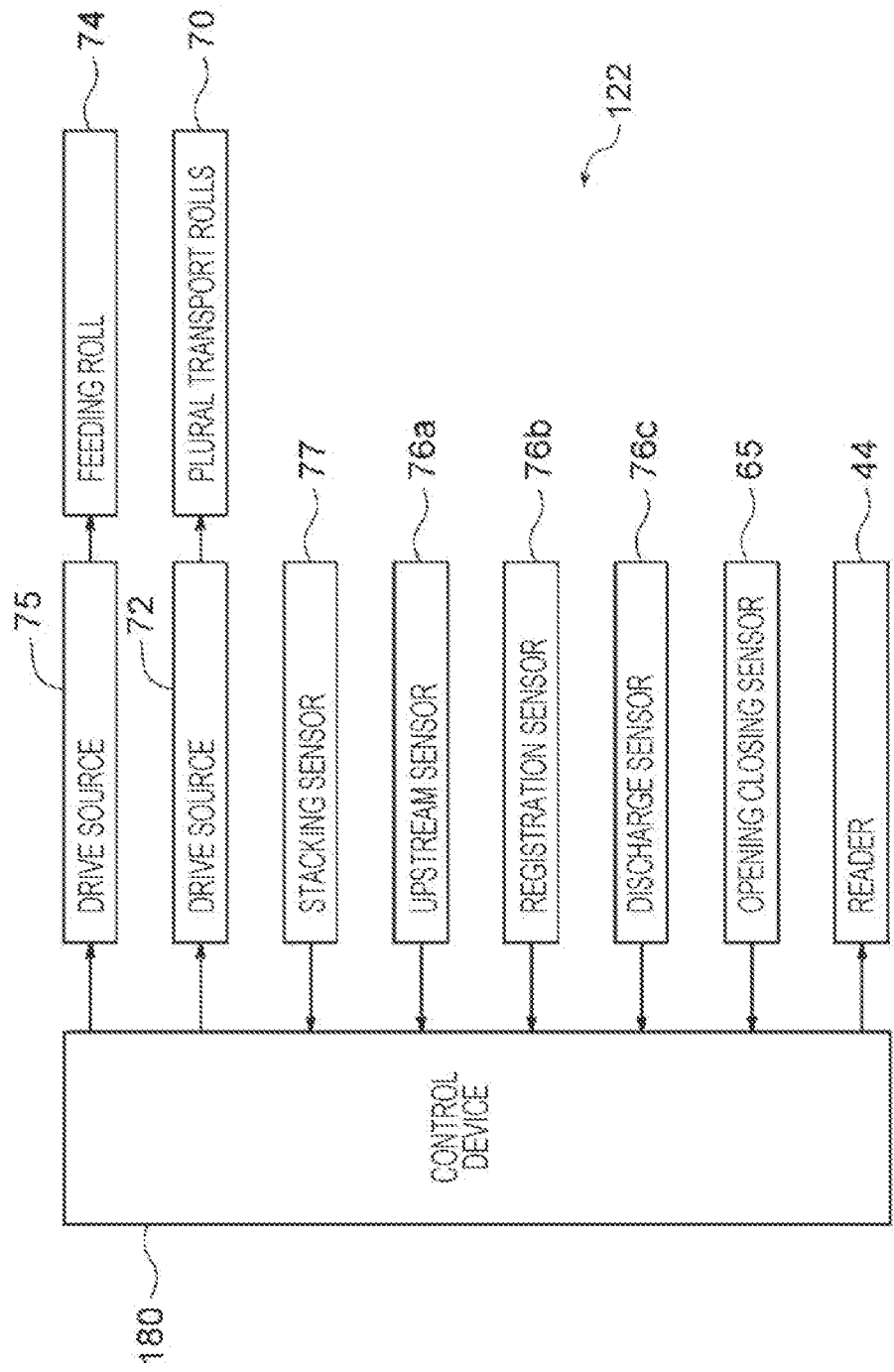
FIG. 17 is a functional block diagram illustrating functions of a control device provided in the reader according to the second exemplary embodiment of the present disclosure.
Figure 18:
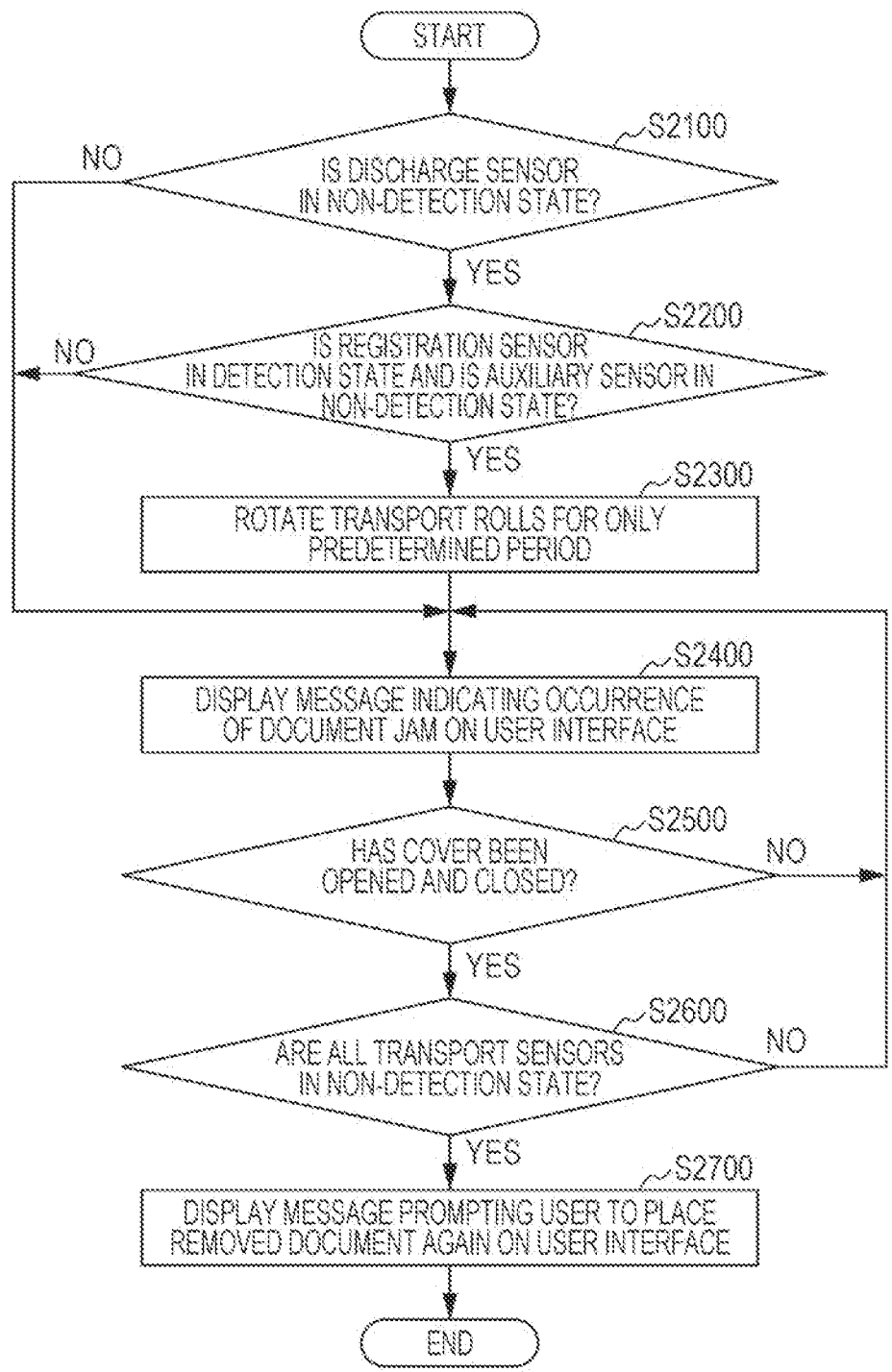
FIG. 18 is an operation flowchart of a case where a document jam occurs in a reader according to a third exemplary embodiment of the present disclosure.

In step S1200, the control device 180 determines whether or not a document G is stopped in an upstream portion 68a of a transport path 68 illustrated in FIG. 16. Specifically, the control device 180 determines whether or not a difference before and after occurrence of the document jam in document passing period for which a document G is detected by an upstream sensor 76a disposed in the upstream portion 68a of the transport path 68 is equal to or larger than a threshold period. The document passing period is a period for which a document G is being detected by the upstream sensor 76a.

A document passing period immediately before the transport rolls 70 stop due to occurrence of a document jam is referred to as a "passing period after occurrence". Meanwhile, a document passing period immediately before the passing period after occurrence is referred to as an "ordinary passing period". For example, in a case where the passing period after occurrence is 1.2 times or more longer than the ordinary passing period, the control device 180 determines that the difference before and after occurrence of the document jam in the document passing period is equal to or larger than the threshold period.

In a case where the difference before and after occurrence of the document jam in the document passing period for which the document G is detected by the upstream sensor 76a disposed in the upstream portion 68a of the transport path 68 is equal to or larger than the threshold period, the control device 180 determines that the document G is stopped in the upstream portion 68a of the transport path 68, as illustrated in FIG. 16.

In a case where the difference before and after occurrence of the document jam in the document passing period is equal to or larger than the threshold period, step S1300 is performed. In other cases, step S1400 is performed.

In step S1300, the control device 180 controls the drive source 72 to rotate all of the transport rolls 70 for only a predetermined period. After all of the transport rolls 70 are rotated for only the predetermined period, step S1400 is performed.

In step S1400, the control device 180 displays a message indicating occurrence of a document jam on a user interface. Then, step S1500 is performed.

In step S1500, the control device 180 determines whether or not an opening closing covering part 64 has been opened and closed. Opening and closing of the opening closing covering part 64 are detected by an opening closing sensor 65 illustrated in FIG. 16. In a case where the opening closing covering part 64 has been opened and closed, step S1600 is performed. In a case where the opening closing covering part 64 has not been opened and closed, step S1400 is performed, in which the control device 180 maintains a state where the message indicating occurrence of a document jam is displayed on the user interface.

In step S1600, the control device 180 determines whether or not all of the transport sensors 76 are in the non-detection state where no document G is being detected. In a case where all of the transport sensors 76 are in the non-detection state where no document G is being detected, step S1700 is performed. In a case where any of the transport sensors 76 is in a detection state where a document G is being detected, step S1400 is performed, in which the control device 180 maintains a state where the message indicating occurrence of a document jam is displayed on the user interface.

In step S1700, the control device 180 displays a message prompting the user to place the removed document G on a stacking unit 56 again on the user interface, and then ends the series of operations.

In a case where the discharge sensor 76c is not in the non-detection state (is in the detection state) in step S1100, step S1400 is performed, in which a message indicating occurrence of a document jam is displayed on the user interface, and then step S1500 is performed.

In a case where the difference before and after occurrence of the document jam in document passing period is less than the predetermined period, step S1400 is performed, in which a message indicating occurrence of the document jam is displayed on the user interface, and then step S1500 is performed.

Summary

As described above, in the reading device 122, all of the transport rolls 70 including the discharge rolls 70e are rotated for only the predetermined period upon occurrence of a document jam in a case where a document G is stopped in the upstream portion 68a of the transport path 68. Accordingly, it becomes less likely that a state where a document G is held between the discharge rolls 70e is maintained than in a case where a state where plural pairs of transport rolls are stopped is maintained upon occurrence of a document jam.

Furthermore, in the reading device 122, all of the transport rolls 70 including the discharge rolls 70e are rotated for only the predetermined period in a case where a document G is stopped in the upstream portion 68a of the transport path 68. Accordingly, even when the transport rolls 70 are rotated, at least a part of the document G stopped in the upstream portion 68a in the transport path 68 remains in the upstream portion 68a of the transport path 68. Therefore, by placing the opening closing covering part 64 at an opened position, the document G that has moved is removed in the upstream portion 68a of the transport path 68.

Furthermore, in the reading device 122, the control device 180 determines that a document G is stopped in the upstream portion 68a of the transport path 68 in a case where a difference before and after occurrence of the document jam in document passing period detected by the upstream sensor 76a is equal to or larger than the threshold period. Therefore, whether or not a document G is stopped in the upstream portion 68a of the transport path 68 is determined without increasing the number of sensors to determine a position where the document G is stopped.

Third Exemplary Embodiment

An example of a reading device and an image forming apparatus according to a third exemplary embodiment of the present disclosure is described with reference to FIGS. 18 to 21. In the third exemplary embodiment, differences from the second exemplary embodiment are mainly described.

Figure 19:
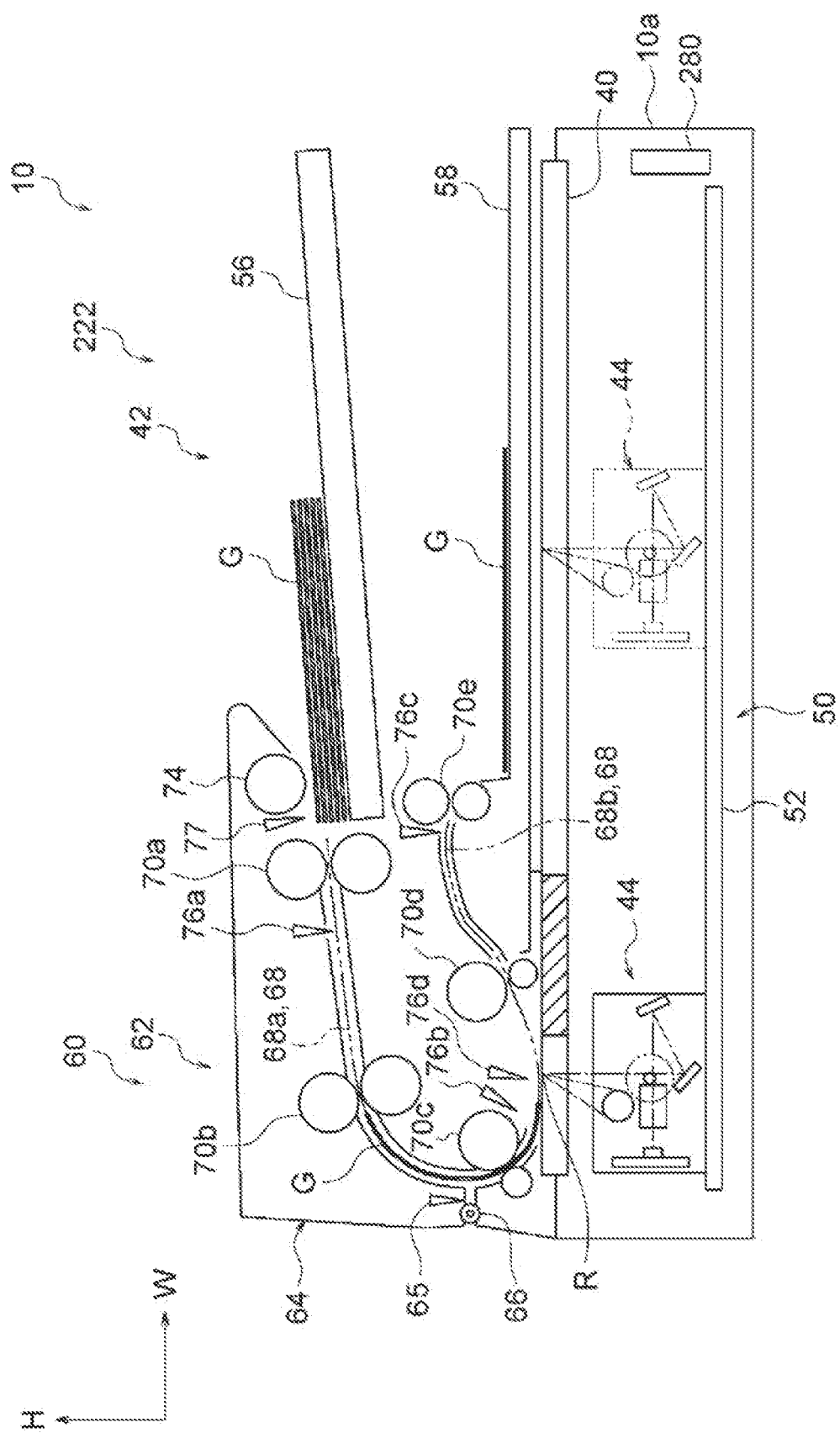
FIG. 19 is a state diagram illustrating a state where a document is transported in the reader according to the third exemplary embodiment of the present disclosure.

A control device 280 (see FIG. 21) provided in a reading device 222 according to the third exemplary embodiment controls each unit. Furthermore, in the reading device 222, a pair of transport sensors 76 are disposed apart from each other in a downstream portion 68b of a transport path 68 and on an upstream side in a document transport direction relative to a reading position R, as illustrated in FIG. 19. Specifically, a registration sensor 76b and an auxiliary sensor 76d are arranged in this order from an upstream side toward a downstream side in the document transport direction. The following describes how each unit operates in a case where the control device 280 determines that a document jam has occurred with reference to the flowchart illustrated in FIG. 18.

Jammed State

In a case the control device 280 determines that a document jam has occurred, the control device 280 stops all transport rolls 70 by deactivating a drive source 72. Then, step S2100 is performed.

In step S2100, the control device 280 determines whether or not a discharge sensor 76c is in a non-detection state. In a case where the discharge sensor 76c is in the non-detection state, step S2200 is performed. In a case where the discharge sensor 76c is not in the non-detection state (is in a detection state), step S2400 is performed.

In step S2200, the control device 280 determines whether or not a document G is stopped in an upstream portion 68a of a transport path 68 illustrated in FIG. 19. Specifically, the control device 280 determines whether or not the registration sensor 76b on an upstream side is in a detection state where a document G is being detected and the auxiliary sensor 76d on a downstream side is in a non-detection state where no document G is being detected.

In a case where the registration sensor 76b on an upstream side is in the detection state and the auxiliary sensor 76d on a downstream side is in the non-detection state, the control device 280 determines that a document G is stopped in the upstream portion 68a of the transport path 68, as illustrated in FIG. 19.

In a case where the registration sensor 76b is in the detection state and the auxiliary sensor 76d is in the non-detection state, step S2300 is performed. In other cases, step S2400 is performed.

Figure 20:
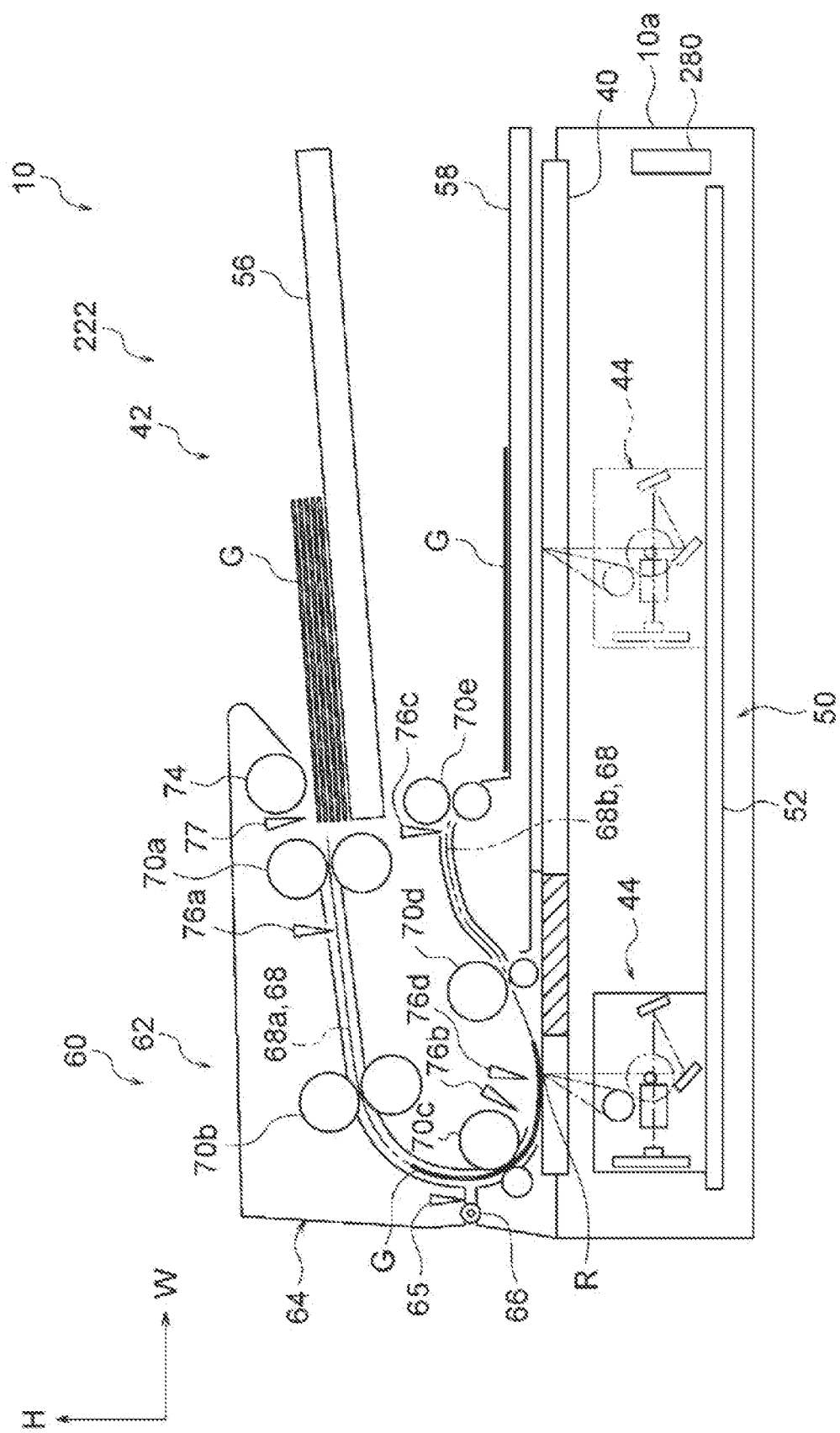
FIG. 20 is a state diagram illustrating a state where a document is transported in the reader according to the third exemplary embodiment of the present disclosure.
Figure 21:
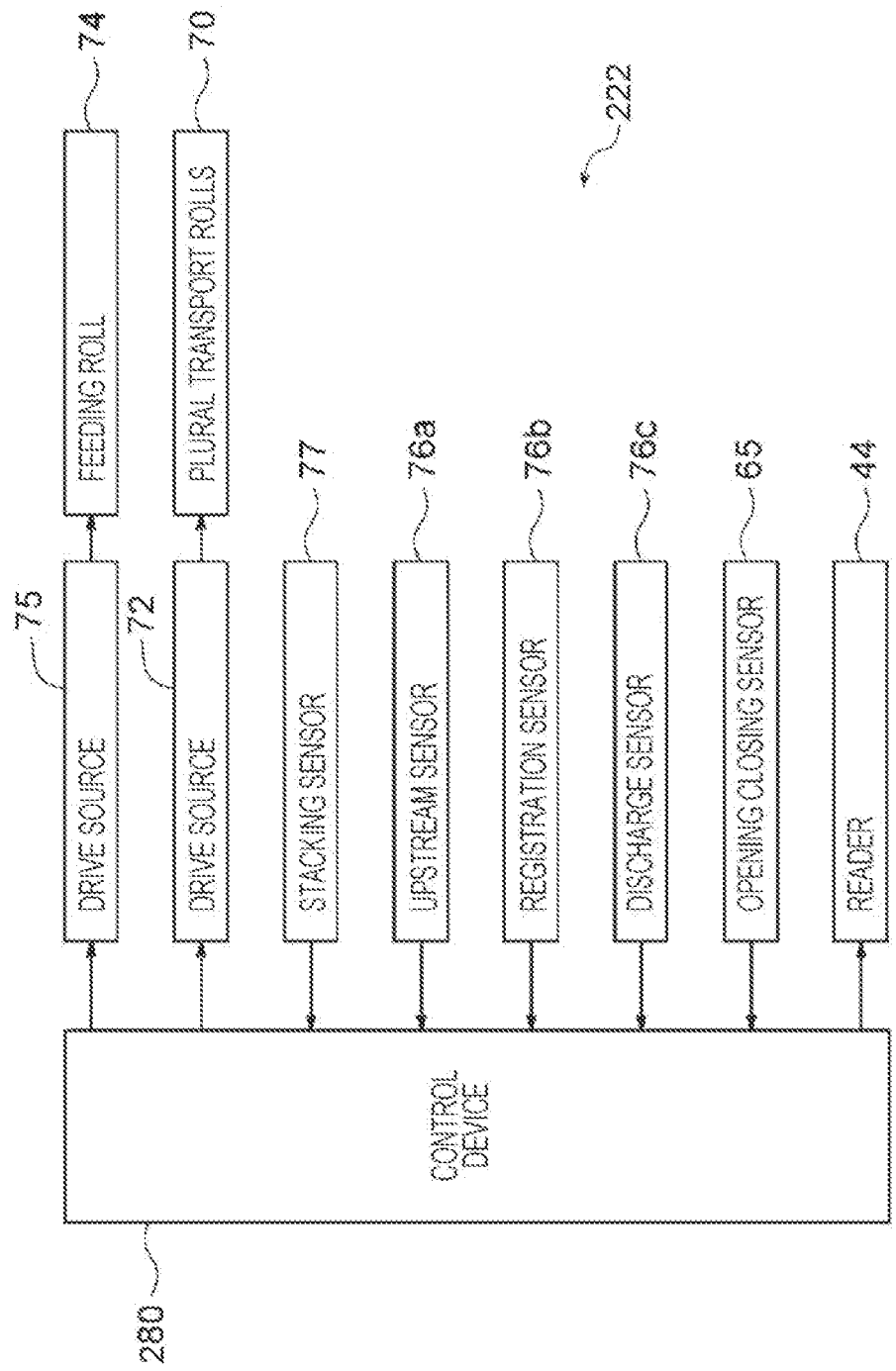
FIG. 21 is a functional block diagram illustrating functions of a control device provided in the reader according to the third exemplary embodiment of the present disclosure.

In step S2300, the control device 280 controls the drive source 72 to rotate all of the transport rolls 70 for only a predetermined period. Since the document G is stopped in the upstream portion 68a of the transport path 68, at least a part of the document G remains in the upstream portion 68a of the transport path 68 as illustrated in FIG. 20 even in a case where all of the transport rolls 70 are rotated for only the predetermined period. After all of the transport rolls 70 are rotated for only the predetermined period, step S2400 is performed.

In step S2400, the control device 280 displays a message indicating occurrence of a document jam on a user interface. Then, step S2500 is performed.

In step S2500, the control device 280 determines whether or not an opening closing covering part 64 has been opened and closed. In a case where the opening closing covering part 64 has been opened and closed, step S2600 is performed. In a case where the opening closing covering part 64 has not been opened and closed, step S2400 is performed, in which the control device 280 maintains a state where the message indicating occurrence of a document jam is displayed on the user interface.

In step S2600, the control device 280 determines whether or not all of the transport sensors 76 are in the non-detection state where no document G is being detected. In a case where all of the transport sensors 76 are in the non-detection state where no document G is being detected, step S2700 is performed. In a case where any of the transport sensors 76 is in a detection state where a document G is being detected, step S2400 is performed, in which the control device 280 maintains a state where the message indicating occurrence of a document jam is displayed on the user interface.

In step S2700, the control device 280 displays a message prompting the user to place the removed document G on a stacking unit 56 again on the user interface, and then ends the series of operations.

In a case where the discharge sensor 76c is not in the non-detection state (is in a detection state) in step S2100, step S2400 is performed, in which a message indicating occurrence of a document jam is displayed on the user interface, and then step S2500 is performed.

In a case where it is not determined in step S2200 that the registration sensor 76b is in the detection state and the auxiliary sensor 76d is in the non-detection state, step S2400 is performed, in which a message indicating occurrence of a document jam is displayed on the user interface, and then step S2500 is performed.

Summary

As described above, in the reading device 222, all of the transport rolls 70 including the discharge rolls 70e are rotated for only the predetermined period upon occurrence of a document jam in a case where a document G is stopped in the upstream portion 68a of the transport path 68. Accordingly, it becomes less likely that a state where a document G is held between the discharge rolls 70e is maintained than in a case where a state where plural pairs of transport rolls are stopped is maintained upon occurrence of a document jam.

Furthermore, in the reading device 222, all of the transport rolls 70 including the discharge rolls 70e are rotated for only the predetermined period in a case where a document G is stopped in the upstream portion 68a of the transport path 68. Accordingly, even when the transport rolls 70 are rotated, at least a part of the document G stopped in the upstream portion 68a in the transport path 68 remains in the upstream portion 68a of the transport path 68. Therefore, by placing the opening closing covering part 64 at an opened position, the document G that has moved is removed in the upstream portion 68a of the transport path 68.

Furthermore, in the reading device 222, the control device 280 determines that a document G is stopped in the upstream portion 68a of the transport path 68 in a case where the registration sensor 76b on an upstream side is in the detection state and the auxiliary sensor 76d on a downstream side is in the non-detection state. In other words, the control device 280 determines that a document G is stopped in the upstream portion 68a of the transport path 68 based on a position of a front end of the document G jammed inside a device body 62. Accordingly, it is determined that a document G is stopped in the upstream portion 68a of the transport path 68 more accurately than a case where it is determined that a document G is stopped in the upstream portion 68a of the transport path 68 based on whether or not a single sensor disposed in the downstream portion 68b of the transport path 68 is in the detection state.

Although specific exemplary embodiments of the present disclosure have been described in detail, the present disclosure is not limited to these exemplary embodiments, and it is apparent to a person skilled in the art that other various exemplary embodiments can be made within the scope of the present disclosure. For example, although optical sensors are used as the transport sensors 76 in the above exemplary embodiment, the transport sensors 76 may be, for example, mechanical sensors that detect the presence or absence of a document G by making contact with a transported document G.

Although it is determined that a length of a document G is equal to or longer than the threshold length in a case where the length of the document G is 140 or longer assuming that a distance between the separation rolls 70a and the first transport rolls 70b is 100 in the first exemplary embodiment, a value other than 140 may be used, for example, the length may be 160 or longer.

Upon occurrence of a document jam, it may be determined that a document G is stopped in the upstream portion 68a of the transport path 68 in a case where the upstream sensor 76a is in a detection state where a document G is being detected although this is not described in particular in the second and third exemplary embodiments.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A reading device comprising:
    a plurality of transport rolls that transport a document along a transport path, include a discharge roll disposed on a most downstream side of the transport path, and rotate and do not rotate in synchronization with one another;
    an opening and closing unit that exposes or covers an upstream portion of the transport path;
    a plurality of detectors that are provided apart from one another along the transport path, detect a transported document, and include a discharge detector that is disposed on a most downstream side of the transport path and is disposed on an upstream side relative to the discharge roll in a document transport direction;
    a reader that reads an image formed on a transported document in a downstream portion of the transport path; and
    a controller that stops the plurality of transport rolls once upon occurrence of a document jam inside a device body by controlling the transport rolls and rotates the transport rolls for only a predetermined period in a case where the discharge detector is detecting no document and a length of a document is equal to or longer than a threshold length.

2. The reading device according to claim 1, wherein the controller determines that the length of the document is equal to or longer than the threshold length in a case where the length of the document is longer by a predetermined length or more than a longest roll-to-roll distance among distances between pairs of transport rolls adjacent along the transport path.

3. An image forming apparatus comprising:
    the reading device according to claim 1; and
    an image former that forms an image read by the reading device on a recording medium.

4. A reading device comprising:
    a plurality of transport rolls that transport a document along a transport path, include a discharge roll disposed on a most downstream side of the transport path, and rotate and do not rotate in synchronization with one another;

an opening and closing unit that exposes or covers an upstream portion of the transport path;

a plurality of detectors that are provided apart from one another along the transport path, detect a transported document, and include a discharge detector that is disposed on a most downstream side of the transport path and is disposed on an upstream side relative to the discharge roll in a document transport direction;

a reader that reads an image formed on a transported document in a downstream portion of the transport path; and a controller that stops the plurality of transport rolls once upon occurrence of a document jam inside a device body by controlling the transport rolls and rotates the transport rolls for only a predetermined period in a case where the discharge detector is detecting no document and a jammed document is stopped in the upstream portion of the transport path.

5. The reading device according to claim 4, wherein
the plurality of detectors include a detector disposed in the upstream portion of the transport path; and
the controller determines that the jammed document is stopped in the upstream portion of the transport path in a case where a difference before and after occurrence of the document jam in document passing period for which a document is detected by the detector disposed in the upstream portion of the transport path is equal to or larger than a threshold period.

6. The reading device according to claim 4, wherein
the plurality of detectors include a pair of detectors that are disposed apart from each other in the downstream portion of the transport path and on an upstream side relative to a reading position at which an image is read by the reader; and
the controller determines, upon occurrence of the document jam, that the jammed document is stopped in the upstream portion of the transport path in a case where an upstream one of the pair of detectors is detecting the document and a downstream one of the pair of detectors is detecting no document.

* * * * *